(12) United States Patent
Abedini et al.

(10) Patent No.: US 12,245,173 B2
(45) Date of Patent: Mar. 4, 2025

(54) NETWORK ENERGY SAVING WITH DISCOVERY SIGNALS

(71) Applicant: QUALCOMM Incorporated, San Diego, CA (US)

(72) Inventors: Navid Abedini, Basking Ridge, NJ (US); Jianghong Luo, Skillman, NJ (US); Aria Hasanzadezonuzy, Somerville, NJ (US); Naeem Akl, Somerville, NJ (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/733,291

(22) Filed: Apr. 29, 2022

(65) Prior Publication Data

US 2023/0354224 A1    Nov. 2, 2023

(51) Int. Cl.
| | |
|---|---|
| *H04W 56/00* | (2009.01) |
| *H04J 11/00* | (2006.01) |
| *H04W 8/00* | (2009.01) |
| *H04W 24/10* | (2009.01) |
| *H04W 52/02* | (2009.01) |

(52) U.S. Cl.
CPC ....... *H04W 56/001* (2013.01); *H04J 11/0073* (2013.01); *H04W 8/005* (2013.01); *H04W 24/10* (2013.01); *H04W 52/0212* (2013.01)

(58) Field of Classification Search
CPC ... H04W 56/001; H04W 8/005; H04W 24/10; H04W 52/0212; H04W 48/14; H04W 52/0229; H04W 52/028; H04W 48/12; H04J 11/0073; H04L 5/14; H04L 5/16; H04L 27/2602; H04L 5/0048; H04L 5/0082; H04L 5/0026; H04L 5/001
See application file for complete search history.

(56) References Cited

U.S. PATENT DOCUMENTS

| | | | |
|---|---|---|---|
| 2015/0049649 A1* | 2/2015 | Zhu | H04W 52/287 370/329 |
| 2020/0146041 A1* | 5/2020 | Kim | H04J 11/0076 |
| 2020/0229271 A1* | 7/2020 | You | H04W 72/23 |
| 2022/0104251 A1* | 3/2022 | Noh | H04L 1/18 |

(Continued)

FOREIGN PATENT DOCUMENTS

| | | | | |
|---|---|---|---|---|
| WO | WO-2017111983 A1 * | 6/2017 | ........... | H04B 7/0413 |
| WO | WO-2019195376 A1 * | 10/2019 | ............... | H04L 1/08 |

OTHER PUBLICATIONS

International Search Report and Written Opinion—PCT/US2023/016148—ISA/EPO—Jun. 28, 2023.

(Continued)

*Primary Examiner* — Shailendra Kumar
(74) *Attorney, Agent, or Firm* — Loza & Loza, LLP

(57) ABSTRACT

Aspects of the present disclosure provide mechanisms for transmitting discovery signals to enable discovery of a cell. Synchronization signal blocks (SSBs) carrying the cell identifier of the cell may then be transmitted either on-demand or with a higher periodicity than discovery signals. The discovery signals and SSBs may be transmitted within a same bandwidth part and on at least overlapping sets of frequency resources.

29 Claims, 25 Drawing Sheets

(56) References Cited

U.S. PATENT DOCUMENTS

2022/0225306 A1* 7/2022 Back ............ H04W 76/23

OTHER PUBLICATIONS

NTT DOCOMOo., et al., "Discussion on NW Energy Saving Techniques", 3GPP TSG RAN WG1 #109-e, R1-2204392, 3rd Generation Partnership Project (3GPP), Mobile Competence Centre, 650, Route Des Lucioles, F-06921 Sophia-Antipolis Cedex, France, vol. RAN WG1, No. e-Meeting, May 9, 2022-May 20, 2022, Apr. 28, 2022, XP052153520, 5 Pages, paragraph [02.1].
Qualcomm Incorporated: "Network Energy Saving Techniques", 3GPP TSG RAN WG1 #109-e, R1-2205046, 3d Generation Partnership Project (3GPP), Mobile Competence Centre, 650, Route Des Lucioles, F-06921, Sophia-Antipolis Cedex, France, vol. RAN WG1, No. e-Meeting, May 9, 2022-May 20, 2022, Apr. 29, 2022, 19 Pages, XP052191708, 5.1 OTA DPD, Figure 10, paragraph [0002].

* cited by examiner

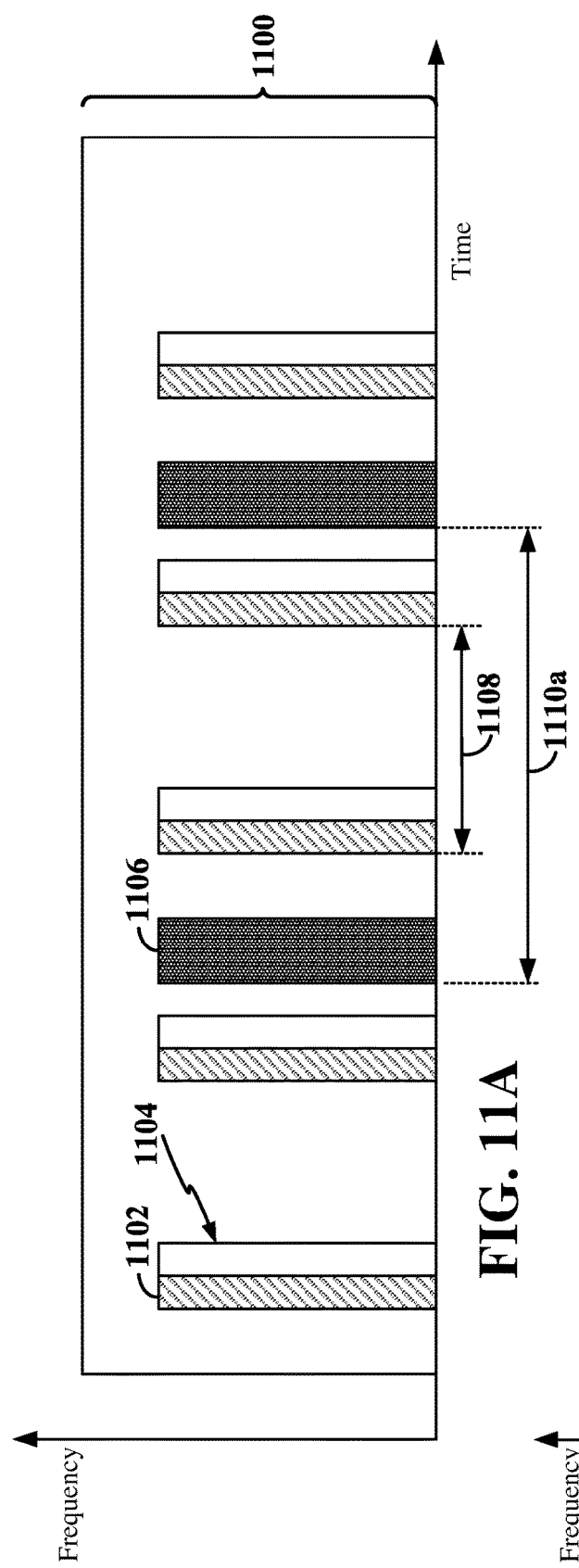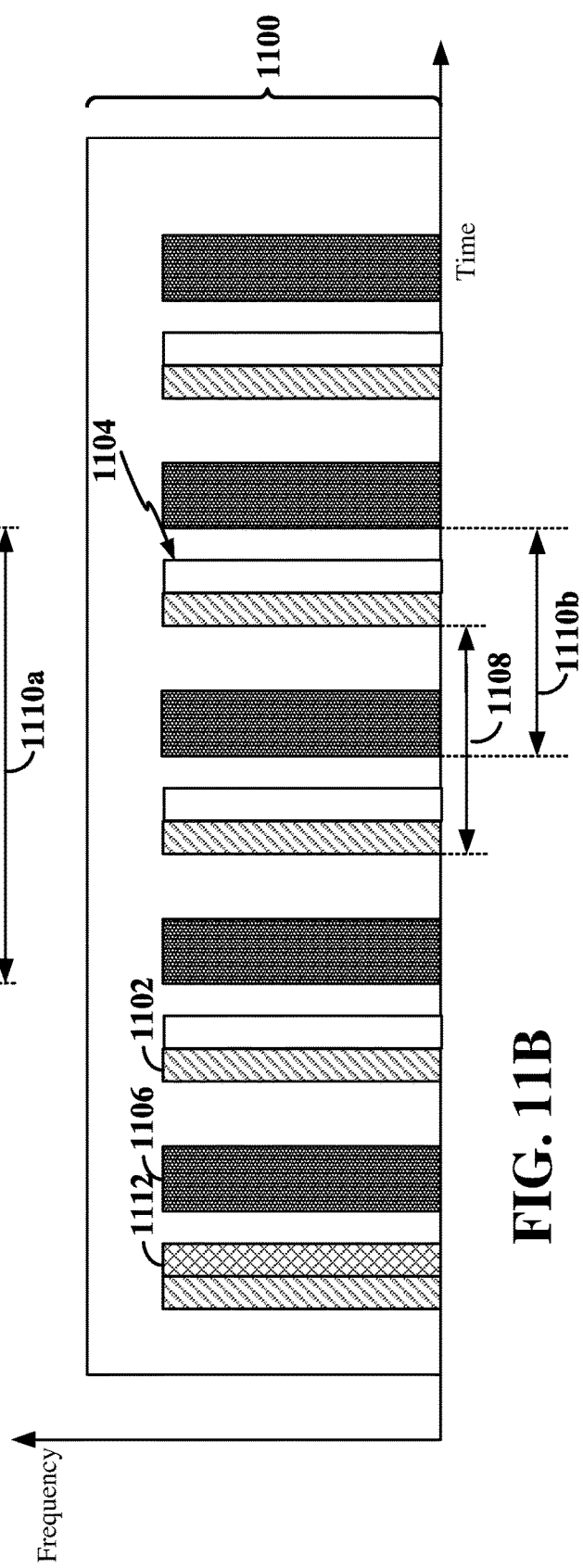

NETWORK ENERGY SAVING WITH DISCOVERY SIGNALS

TECHNICAL FIELD

The technology discussed below relates generally to wireless communication systems, and more particularly, to reduced synchronization signal block (SSB) transmission in a wireless communication network.

INTRODUCTION

In wireless communication systems, such as those specified under standards for 5G New Radio (NR), a network entity (e.g., a base station) may communicate with a user equipment (UE) (e.g., a smartphone) within a cell. The network entity may broadcast synchronization signal blocks (SSBs) in the cell at regular intervals based on a configured periodicity (e.g., 20 ms). A number of SSBs, referred to as an SSB burst set, are typically transmitted in different directions (e.g., on different beams) during a five millisecond (ms) SSB burst time period. For example, in milli-meter wave systems (e.g., FR2 systems), up to sixty-four SSBs may be transmitted in an SSB burst.

An SSB includes a primary synchronization signal (PSS), a secondary synchronization signal (SSS), and a physical broadcast control channel (PBCH). From the PSS and SSS, radio frame, subframe, slot, and symbol synchronization may be achieved in the cell in the time domain. In addition, the PSS and SSS collectively identify the physical cell identity (PCI) of the cell. The PBCH in the SSB may further include a master information block (MIB) that includes various system information, along with parameters for decoding a system information block (SIB). The SIB may be, for example, a SystemInformationType 1 (SIB1) that may include various remaining minimum system information (RMSI) for initial access.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In one example, a network entity configured for wireless communication is disclosed. The network entity includes a memory and a processor coupled to the memory. The processor is configured to provide a discovery signal on a first set of frequency resources within a bandwidth part to facilitate discovery of a cell associated with the network entity and provide a synchronization signal block (SSB) on a second set of frequency resources within the bandwidth part to provide a cell identifier (ID) of the cell. The second set of frequency resources at least partially overlaps the first set of frequency resources.

Another example provides a method for wireless communication at a network entity. The method includes providing a discovery signal on a first set of frequency resources within a bandwidth part to facilitate discovery of a cell associated with the network entity and providing a synchronization signal block (SSB) on a second set of frequency resources within the bandwidth part to provide a cell identifier (ID) of the cell. The second set of frequency resources at least partially overlaps the first set of frequency resources.

Another example provides a user equipment (UE) configured for wireless communication. The UE includes a transceiver, a memory, and a processor coupled to the transceiver and the memory. The processor is configured to receive a discovery signal on a first set of frequency resources within a bandwidth part to facilitate discovery of a cell associated with a network entity and receive a synchronization signal block (SSB) on a second set of frequency resources within the bandwidth part to determine a cell identifier (ID) of the cell. The second set of frequency resources at least partially overlaps the first set of frequency resources.

Another example provides a method for wireless communication at a user equipment (UE). The method includes receiving a discovery signal on a first set of frequency resources within a bandwidth part to facilitate discovery of a cell associated with a network entity and receiving a synchronization signal block (SSB) on a second set of frequency resources within the bandwidth part to determine a cell identifier (ID) of the cell. The second set of frequency resources at least partially overlaps the first set of frequency resources.

These and other aspects will become more fully understood upon a review of the detailed description, which follows. Other aspects, features, and examples will become apparent to those of ordinary skill in the art upon reviewing the following description of specific exemplary aspects in conjunction with the accompanying figures. While features may be discussed relative to certain examples and figures below, all examples can include one or more of the features discussed herein. In other words, while one or more examples may be discussed as having certain features, one or more of such features may also be used in accordance with the various examples discussed herein. Similarly, while examples may be discussed below as device, system, or method examples, it should be understood that such examples can be implemented in various devices, systems, and methods.

BRIEF DESCRIPTION OF THE DRAWINGS

FIGS. 11A and 11B are diagrams illustrating an exemplary dynamically changing periodic system information technique according to some aspects.

DETAILED DESCRIPTION

Figure 1:
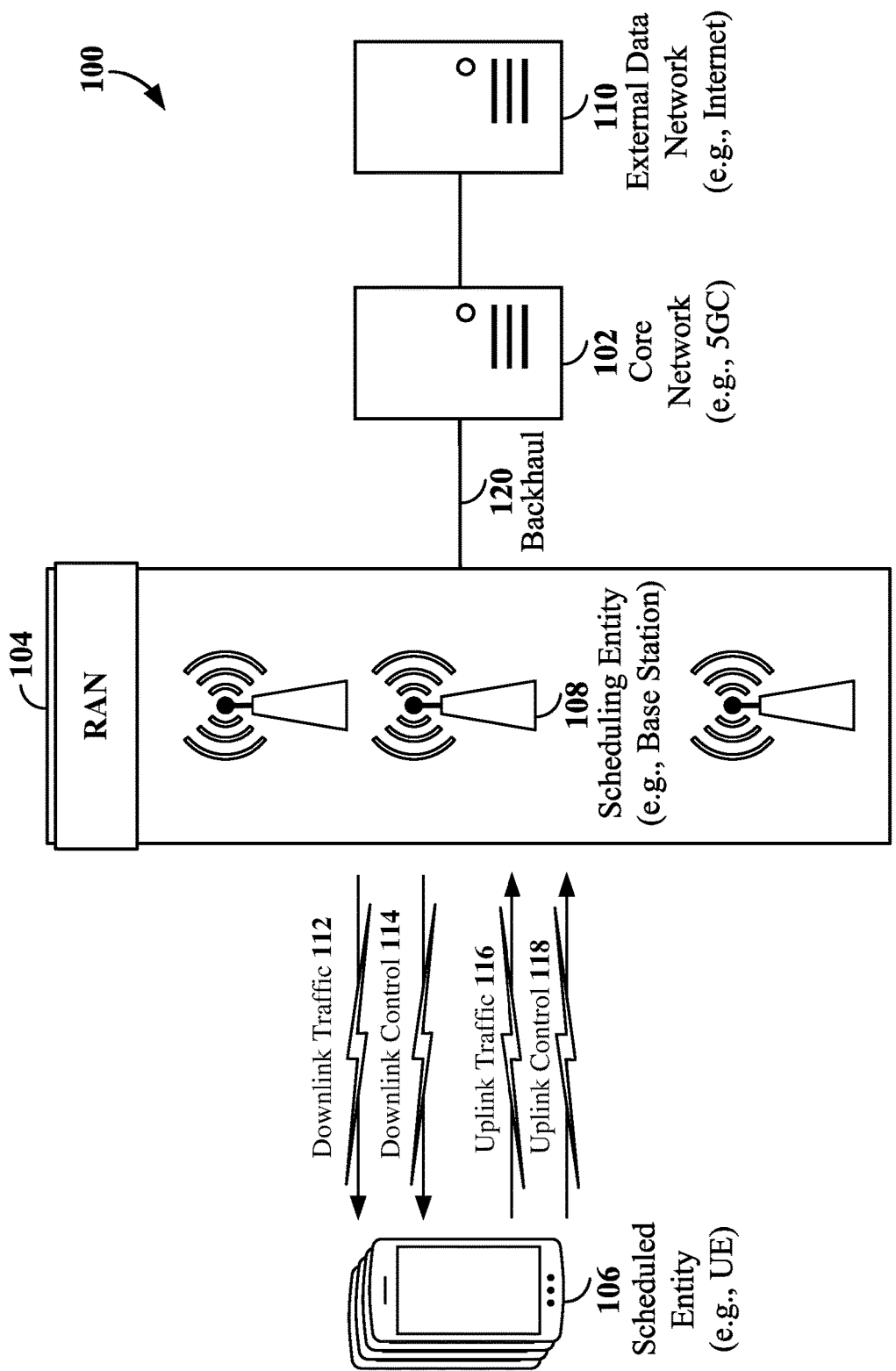
FIG. 1 is a diagram illustrating an example of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component-based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for the implementation and practice of claimed and described examples. For example, transmission and reception of wireless signals necessarily includes a number of components for analog and digital purposes (e.g., hardware components including antenna, radio frequency (RF) chains (RF-chains), power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure provide mechanisms for network energy reduction using discovery signals. A network entity may transmit discovery signals to enable discovery of a cell associated with the network entity. The network entity may then transmit synchronization signal blocks (SSBs) carrying the cell identifier of the cell either on-demand or with a higher periodicity than discovery signals. The discovery signals and SSBs may be transmitted within a same bandwidth part and on at least overlapping sets of frequency resources. In some examples, the discovery signals and SSBs may be transmitted on the same frequency resources.

In some examples, the network entity may transmit a plurality of discovery signal bursts within an SSB period. In this example, the discovery signal bursts may carry either a burst index identifying the discovery signal burst within the SSB period or a burst offset to a next SSB burst. In some examples, the discovery signal may include a first primary synchronization signal (PSS) associated with a first PSS identifier (ID) and the SSB may include a second PSS associated with a second PSS ID, where the first and second PSS IDs are different. In this example, the network entity may provide a mapping between the first and second PSS IDs.

In some examples, the UE may transmit an uplink trigger associated with transmission of the SSB. The uplink trigger may be transmitted, for example, within the same bandwidth part and on overlapping frequency resources with respect to the discovery signal and the SSB. In response to the uplink trigger, the network entity may transmit an on-demand SSB or may reduce the periodicity of SSBs. In some examples, the network entity may further transmit reduced periodicity SSBs in a direction of the UE (e.g., using beamforming). In some examples, the UE may identify a resource associated with transmission of the uplink trigger based on the discovery signal. As an example, the discovery signal may include an offset to the uplink trigger (e.g., the uplink trigger resource). As another example, the network entity may transmit a plurality of discovery signal bursts within an uplink trigger period. Each of the discovery signal bursts may include a burst offset to a next uplink trigger burst.

In some examples, the network entity may transmit the on-demand SSB or reduce the periodicity of SSBs based on a measurement (e.g., signal strength) of the uplink trigger. For example, the network entity may transmit the on-demand SSB or reduce the SSB periodicity in response to the measurement being greater than or equal to a threshold. In some examples, the network entity may either not transmit the on-demand SSB (or reduce the SSB periodicity) or may delay transmission of the on-demand SSB (or delay reduction of the SSB periodicity) in response to the measurement of the uplink trigger being less than the threshold. In some examples, the network entity may delay transmission (or delay reduction in SSB periodicity) by a delay amount based on a mapping between the measurement and the delay amount. In this example, each delay amount may be associated with a respective threshold. In some examples, the network entity may coordinate SSB transmissions with other nearby network entities. For example, the network entity may transmit a signal (e.g., via over the air or backhaul) to another network entity indicating a response taken by the network entity to the uplink trigger (e.g., send the on-demand SSB, not send the on-demand SSB, delay sending the on-demand SSB, etc.).

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations may be an LTE base station, while another base station may be a 5G NR base station. In addition, one or more of the base stations may have a disaggregated configuration.

The RAN 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present disclosure, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, and/or agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between the RAN 104 and the UE 106 may be described as utilizing an air interface. Transmissions over the air interface from a base station (e.g., base station 108) to one or more UEs (e.g., similar to UE 106) may be referred to as downlink (DL) transmissions. In accordance with certain aspects of the present disclosure, the term downlink may refer to a point-to-multipoint transmission originating at a base station (e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a UE (e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs 106). That is, for scheduled communication, a plurality of UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). For example, UEs may communicate directly with other UEs in a peer-to-peer or device-to-device fashion and/or in a relay configuration.

As illustrated in FIG. 1, a scheduling entity 108 may broadcast downlink traffic 112 to one or more scheduled entities (e.g., one or more UEs 106). Broadly, the scheduling entity 108 is a node or device responsible for scheduling traffic in a wireless communication network, including the downlink traffic 112 and, in some examples, uplink traffic 116 from one or more scheduled entities (e.g., one or more UEs 106) to the scheduling entity 108. On the other hand, the scheduled entity (e.g., a UE 106) is a node or device that receives downlink control information 114, including but not limited to scheduling information (e.g., a grant), synchronization or timing information, or other control information from another entity in the wireless communication network such as the scheduling entity 108. The scheduled entity 106 may further transmit uplink control information 118, including but not limited to a scheduling request or feedback information, or other control information to the scheduling entity 108.

In addition, the uplink and/or downlink control information 114 and/or 118 and/or traffic 112 and/or 116 information may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system 100. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100 and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
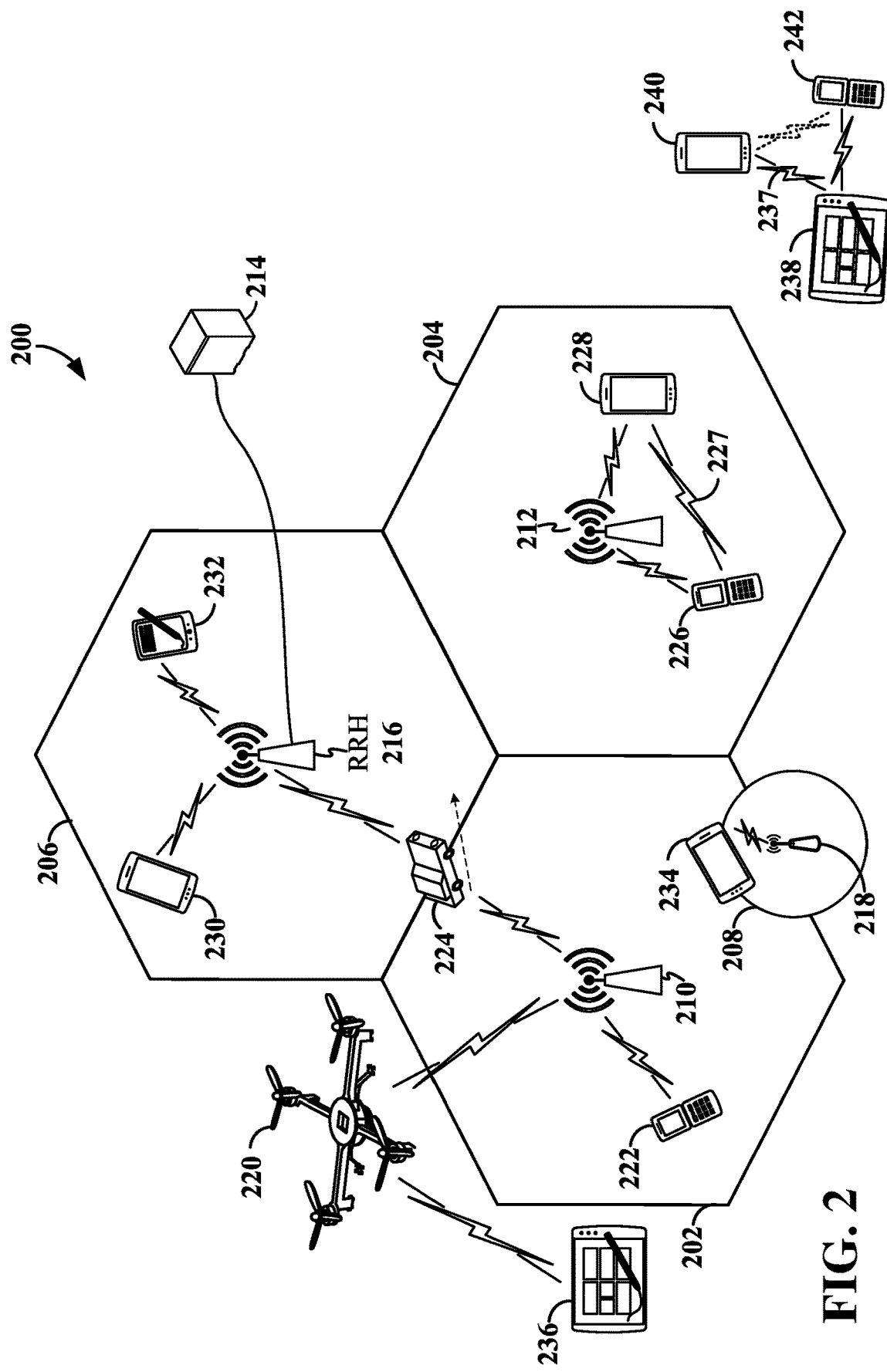
FIG. 2 is a diagram illustrating an example of a radio access network (RAN) according to some aspects.

Referring now to FIG. 2, as an illustrative example without limitation, a schematic illustration of a radio access network (RAN) 200 according to some aspects of the present disclosure is provided. In some examples, the RAN 200 may be the same as the RAN 104 described above and illustrated in FIG. 1.

The geographic region covered by the RAN 200 may be divided into a number of cellular regions (cells) that can be uniquely identified by a user equipment (UE) based on an identification broadcasted over a geographical area from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as or similar to the scheduling entity 108 described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as or similar to the UE/scheduled entity 106 described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In order for transmissions over the air interface to obtain a low block error rate (BLER) while still achieving very high data rates, channel coding may be used. That is, wireless communication may generally utilize a suitable error correcting block code. In a typical block code, an information message or sequence is split up into code blocks (CBs), and an encoder (e.g., a CODEC) at the transmitting device then mathematically adds redundancy to the information message. Exploitation of this redundancy in the encoded information message can improve the reliability of the message, enabling correction for any bit errors that may occur due to the noise.

Data coding may be implemented in multiple manners. In early 5G NR specifications, user data is coded using quasi-cyclic low-density parity check (LDPC) with two different base graphs: one base graph is used for large code blocks and/or high code rates, while the other base graph is used otherwise. Control information and the physical broadcast channel (PBCH) are coded using Polar coding, based on nested sequences. For these channels, puncturing, shortening, and repetition are used for rate matching.

Aspects of the present disclosure may be implemented utilizing any suitable channel code. Various implementations of base stations and UEs may include suitable hardware and capabilities (e.g., an encoder, a decoder, and/or a CODEC) to utilize one or more of these channel codes for wireless communication.

In the RAN 200, the ability of UEs to communicate while moving, independent of their location, is referred to as mobility. The various physical channels between the UE and the RAN 200 are generally set up, maintained, and released under the control of an access and mobility management function (AMF). In some scenarios, the AMF may include a security context management function (SCMF) and a security anchor function (SEAF) that performs authentication. The SCMF can manage, in whole or in part, the security context for both the control plane and the user plane functionality.

In various aspects of the disclosure, the RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, the UE 224 may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCHs)). The UEs 222, 224, 226, 228, 230, and 232 may receive the unified synchronization signals, derive the carrier frequency, and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the RAN 200 may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

Devices communicating in the radio access network 200 may utilize one or more multiplexing techniques and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Devices in the radio access network 200 may also utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, in some scenarios, a channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
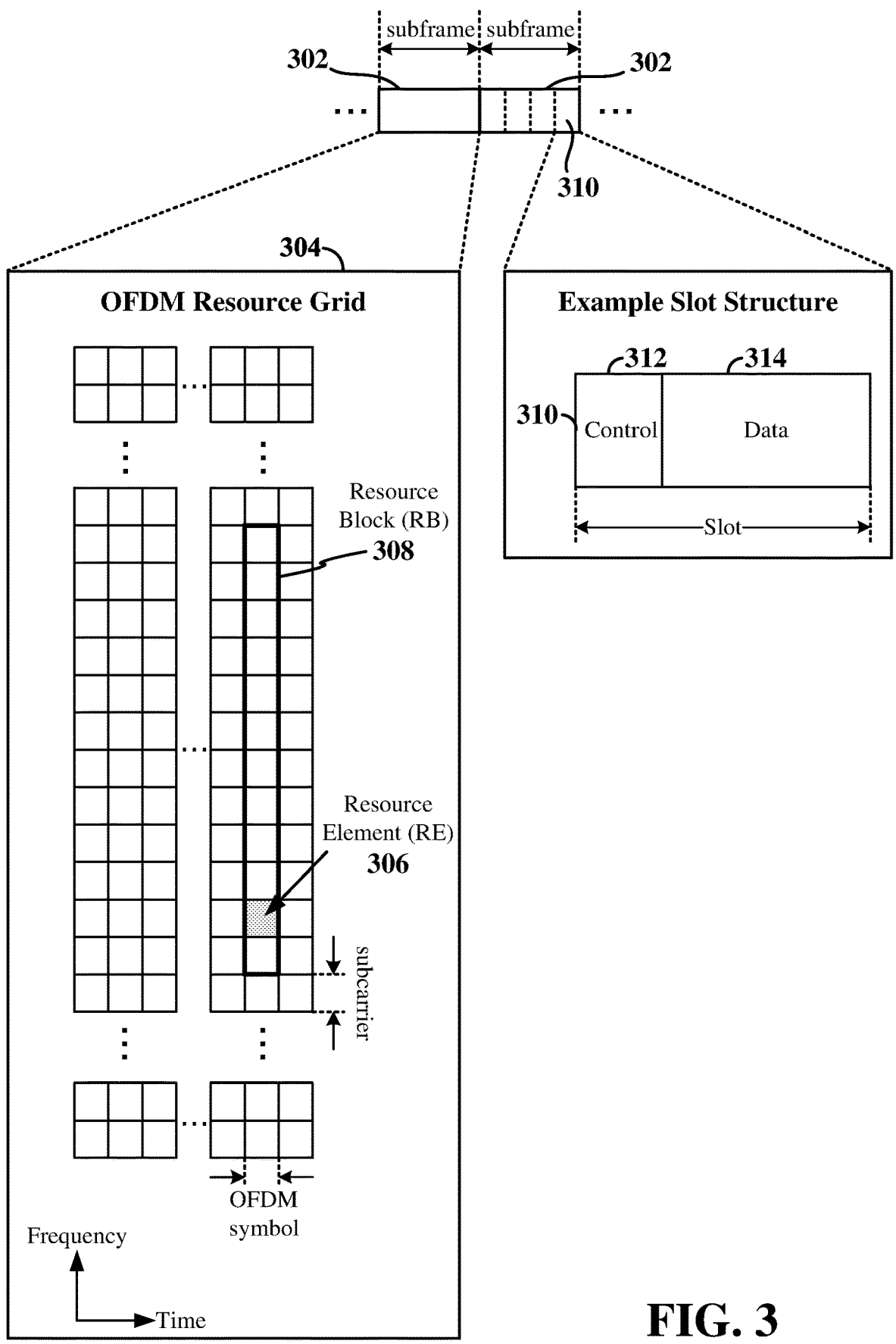
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgement (ACK) or negative acknowledgement (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB 1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Wireless communication networks, such as 4G LTE and/or 5G NR networks, may further support carrier aggregation in a multi-cell transmission environment where, for example, different base stations and/or different transmission and reception points (TRPs) may communicate on different component carriers within overlapping cells. In some aspects, the term component carrier may refer to a carrier frequency (or band) utilized for communication within a cell.

Figure 4:
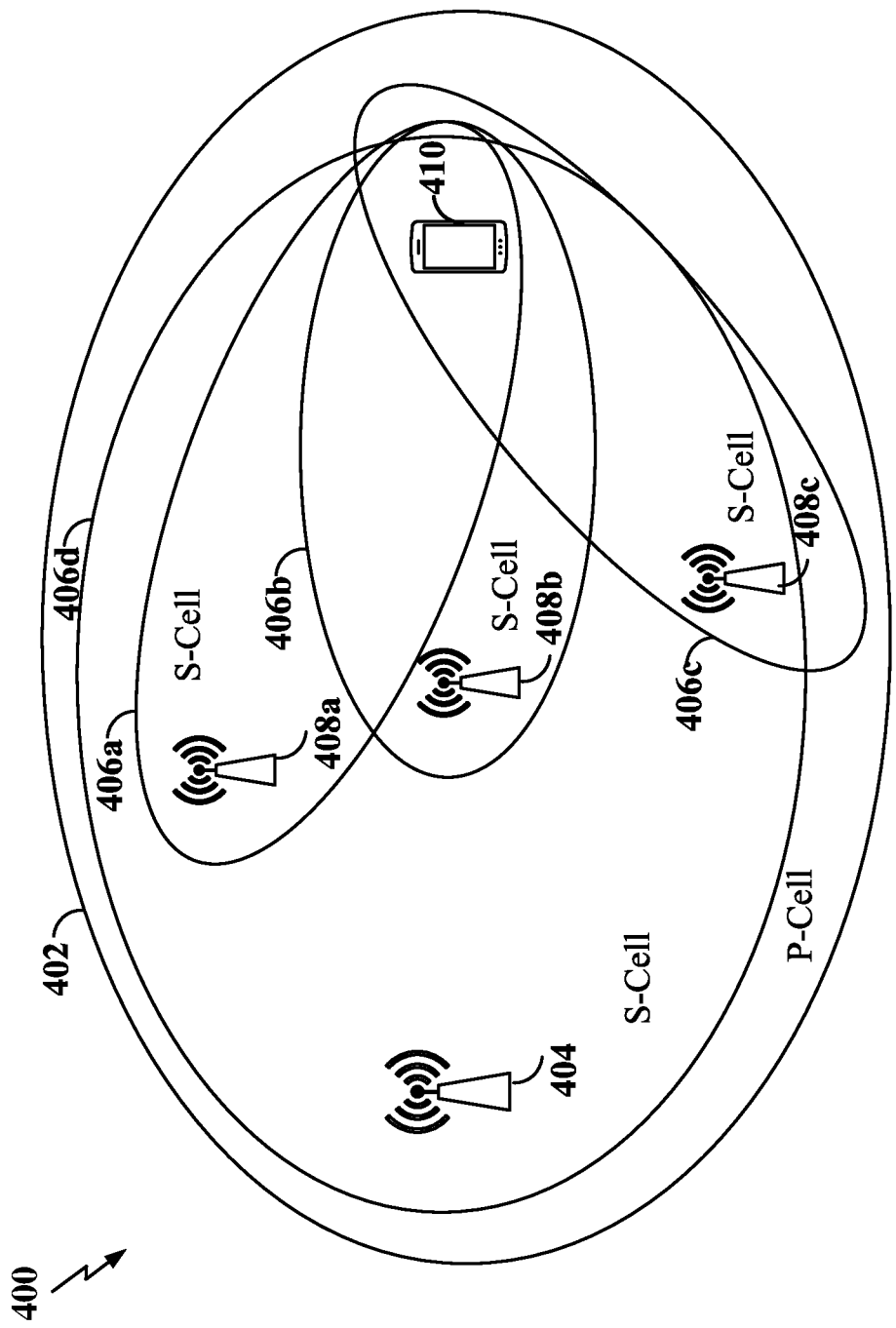
FIG. 4 is a diagram illustrating a multi-cell transmission environment according to some aspects.

FIG. 4 is a diagram illustrating a multi-cell transmission environment 400 according to some aspects. The multi-cell transmission environment 400 includes a primary serving cell (PCell) 402 and one or more secondary serving cells (SCells) 406a, 406b, 406c, and 406d. The PCell 402 may be referred to as the anchor cell that provides a radio resource control (RRC) connection to a UE (e.g., UE 410).

When carrier aggregation is configured in the multi-cell transmission environment 400, one or more of the SCells 406a-406d may be activated or added to the PCell 402 to form the serving cells serving the UE 410. In this case, each of the serving cells corresponds to a component carrier (CC). The CC of the PCell 402 may be referred to as a primary CC, and the CC of a SCell 406a-406d may be referred to as a secondary CC.

Each of the PCell 402 and the SCells 406a-406d may be served by a transmission and reception point (TRP). For example, the PCell 402 may be served by TRP 404 and each of the SCells 406a-406c may be served by a respective TRP 408a-408c. Each TRP 404 and 408a-408c may be a base station (e.g., gNB), remote radio head of a gNB, a radio unit (RU) of disaggregated RAN architecture, or other scheduling entity similar to those illustrated in any of FIG. 1 or 2. In some examples, the PCell 402 and one or more of the SCells (e.g., SCell 406d) may be co-located. For example, a TRP for the PCell 402 and a TRP for the SCell 406d may be installed at the same geographic location. Thus, in some examples, a TRP (e.g., TRP 404) may include multiple TRPs, each corresponding to one of a plurality of co-located antenna arrays, and each supporting a different carrier (different CC). However, the coverage of the PCell 402 and SCell 406d may differ since component carriers in different frequency bands may experience different path loss, and thus provide different coverage.

The PCell 402 is responsible not only for connection setup, but also for radio resource management (RRM) and radio link monitoring (RLM) of the connection with the UE 410. For example, the PCell 402 may activate one or more of the SCells (e.g., SCell 406a) for multi-cell communication with the UE 410 to improve the reliability of the connection to the UE 410 and/or to increase the data rate. In some examples, the PCell may activate the SCell 406a on an as-needed basis instead of maintaining the SCell activation when the SCell 406a is not utilized for data transmission/reception in order to reduce power consumption by the UE 410.

In some examples, the PCell 402 may be a low band cell, and the SCells 406 may be high band cells. A low band (LB) cell uses a CC in a frequency band lower than that of the high band cells. For example, the high band cells may each use a respective mmWave CC (e.g., FR2 or higher), and the low band cell may use a CC in a lower frequency band (e.g., sub-6 GHz band or FR1). In general, a cell using an FR2 or higher CC can provide greater bandwidth than a cell using an FR1 CC. In addition, when using above-6 GHz frequency (e.g., mmWave) carriers, beamforming may be used to transmit and receive signals.

In some examples, the PCell 402 may utilize a first radio access technology (RAT), such as LTE, while one or more of the SCells 406 may utilize a second RAT, such as 5G-NR. In this example, the multi-cell transmission environment may be referred to as a multi-RAT-dual connectivity (MR-DC) environment. One example of MR-DC is an Evolved-Universal Terrestrial Radio Access Network-New Radio dual connectivity (EN-DC) mode that enables a UE to simultaneously connect to an LTE base station and a NR base station to receive data packets from and send data packets to both the LTE base station and the NR base station.

To facilitate initial access, RRM, and beamforming with the PCell 402, the PCell 402 may be configured to periodically transmit SSBs in a beam-sweeping manner. In addition, one or more of the SCells 406a-406d may be configured to periodically transmit SSBs in a beam-sweeping manner.

Figure 5:
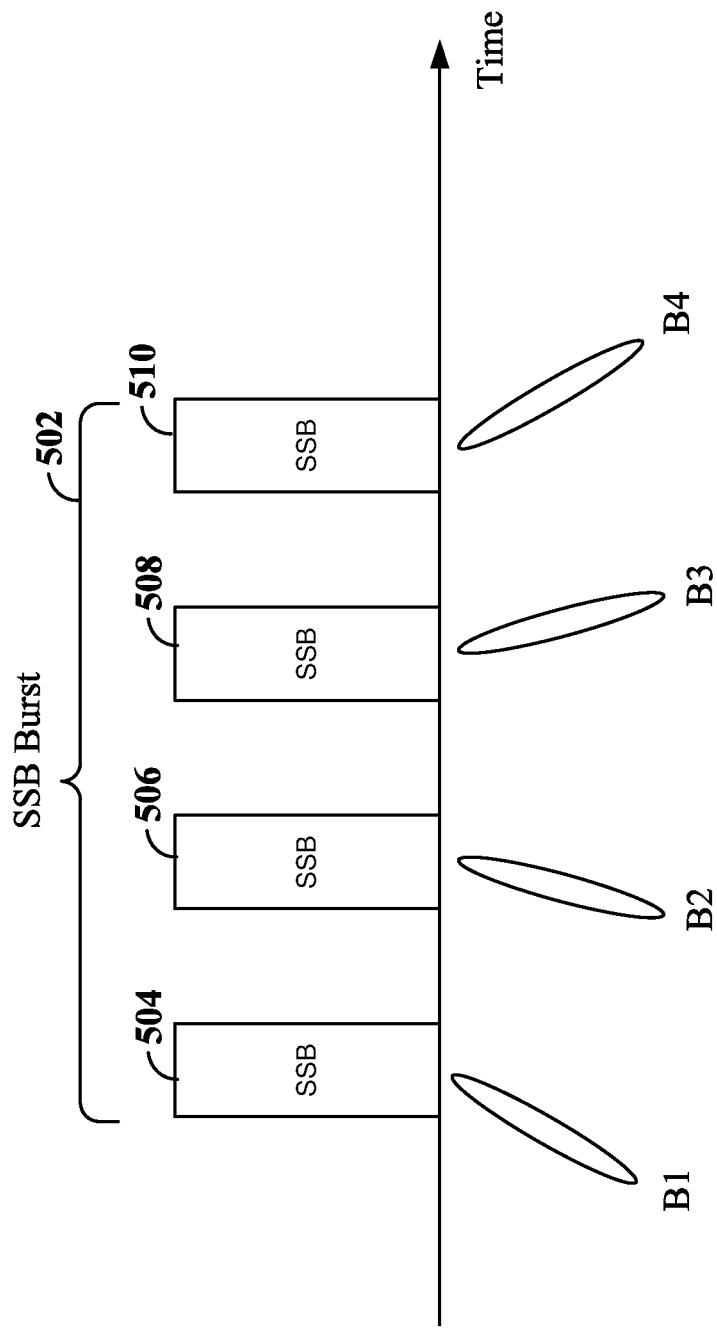
FIG. 5 is a diagram illustrating exemplary SSB transmissions according to some aspects.

FIG. 5 is a diagram illustrating exemplary SSB transmissions according to some aspects. A network entity can broadcast an SSB burst 502 having a number of SSBs using different beams (e.g., conceptually illustrated as beams B1, B2, B3, and B4) or beam directions. Each SSB is transmitted on a corresponding beam (e.g., beam B1 for a first SSB 504, beam B2 for a second SSB 506, beam B3 for a third SSB 508, and beam B4 for a fourth SSB 510) with a different direction. Although four exemplary SSBs are illustrated in FIG. 5, the number of SSBs may vary depending on the frequency range (e.g., FR1, FR2, etc) within which the SSBs are transmitted. For example, 4 SSBs may be used for FR1 below 3 GHz, 8 SSBs may be used for FR1 between 3 and 6 GHz, and 64 SSBs may be used for FR2.

Each SSB can have a different beam direction and can be identified by a unique SSB index or beam index. A UE can measure the signal strength of each SSB, for example, by measuring a reference signal (e.g., DM-RS) included in the PBCH of the SSB. From the measurements, the UE can identify the SSB beam with the best or the strongest signal strength (e.g., highest RSRP or SINR). The UE may select the beam with the highest signal strength and attempt to decode the contents of the SSB received on the selected beam.

Figure 6:
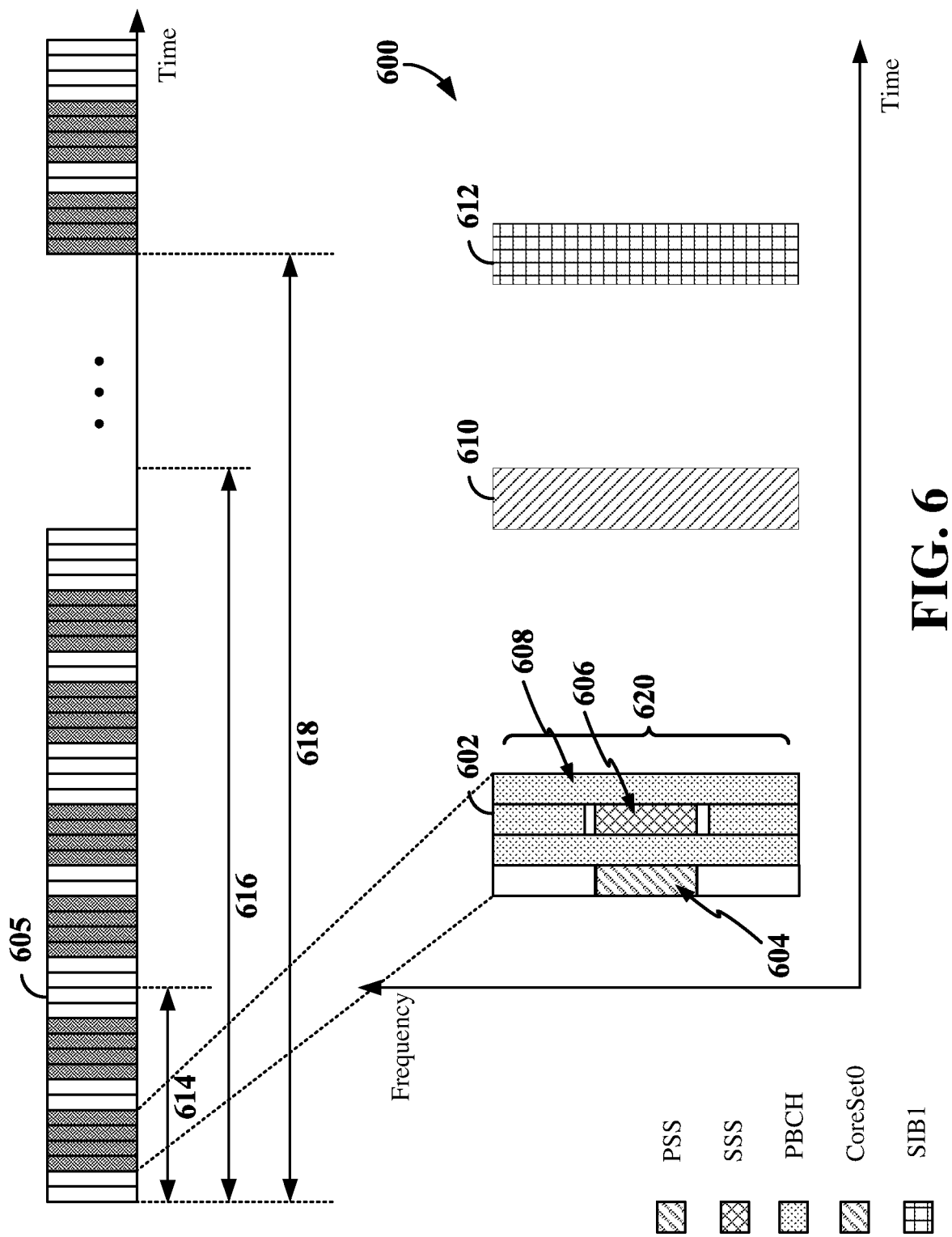
FIG. 6 is a diagram illustrating various system information related to cell access that may be broadcast in a cell according to some aspects.

FIG. 6 is a diagram illustrating various system information 600 related to cell access that may be broadcast in a cell according to some aspects. The system information (SI) 600 may include, for example, an SSB 602, a CORESET0 610, and a SIB1 612. The SSB 602 may be broadcast, for example, over four OFDM symbols 605 of a slot 614 in the time domain and over a number of PRBs 620 (e.g., 20 PRBs) in the frequency domain. In addition, the SSB 602 may have a periodicity 618 of, for example, 20 ms or other suitable periodicity.

The SSB 602 may include a PSS 604, a SSS 606, and a PBCH 608. The PSS 604 may be transmitted in the first OFDM symbol of the SSB and may occupy, for example, 127 subcarriers in the frequency domain. The remaining subcarriers within the total SSB PRBs 620 in the first OFDM symbol are empty. The SSS 606 is transmitted in the third OFDM symbol of the SSB and occupies the same set of 127 subcarriers as the PSS. The PBCH 608 is transmitted on the second and fourth OFDM symbols of the SSB and occupies the entire number of PRBs (e.g., 20 PRBs) 620 of the SSB. In addition, the PBCH 608 is further transmitted on the third OFDM symbol and occupies 48 subcarriers on either side of the SSS. Respective sets of empty subcarriers on either side of the SSS 606 separate the SSS 606 and PBCH 608 on the third OFDM symbol.

The PSS 604, SSS 606, and PBCH 608 enable a UE to identify a cell and synchronize with the timing of the cell. For example, the PSS 604 may include a PSS sequence selected from a set of PSS sequences, such as maximum length sequences (m-sequences). In addition, the SSS 606 may include a SSS sequence selected from a set of SSS sequences, such as m-sequences. For example, the PSS sequence for an SSB may be selected from one of three M-sequences, each having a sequence length of 127, determined from a set of PSS defined shifts $N_{ID}^{(2)} \in \{0,1,2\}$, while the SSS sequence for an SSB may be selected from one of 336 M-sequences, each having a sequence length of 127, determined from a set of SSS defined shifts $N_{ID}^{(1)} \in \{0, \ldots, 335\}$. In some examples, the PSS/SSS sequences identify the PCI (e.g., the PCI of the cell within which the SSB 602 is transmitted). For example, the PCI ($N_{ID}^{Cell}$) may be defined by $N_{ID}^{Cell} = 3N_{ID}^{(1)} + N_{ID}^{(2)}$, where $N_{ID}^{(1)}$ is the SSS range from 0 to 335 and $N_{ID}^{(2)}$ is the PSS range from 0 to 2. By successfully demodulating the PSS, the value $N_{ID}^{(2)}$ may be obtained. The SSS may then be demodulated and combined with knowledge of $N_{ID}^{(2)}$ to obtain $N_{ID}^{(1)}$.

The PBCH 608 includes the MIB carrying various system information such as, for example, an SSB time index identifying the SSB location within an SSB burst set, a cell barred indication, the subcarrier spacing, the first PDSCH DMRS position, the system frame number, and scheduling information for the CORESET0 610. For example, the PBCH 608 may include a search space for the CORESET0 610. In some examples, the CORESET0 610 may carry a PDCCH with DCI that contains scheduling information for scheduling the SIB1 612. The SIB1 612 is carried within a physical downlink shared channel (PDSCH) within a data region of a slot 614. In addition, the SIB1 612 contains remaining minimum system information (RMSI), including, for example, a set of radio resource parameters providing network identification and configuration. For example, the set of radio resource parameters may include a bandwidth (e.g., number of BWPs) on which a UE may communicate with the network entity and a set of RACH occasions on which the UE may initiate an initial access procedure (e.g., a RACH procedure). The UE may use the RACH procedure to request other system information (OSI), for example, SIB2 to SIB9.

The SSB 602 may be transmitted in a beam-sweeping manner, as illustrated in FIG. 5. For example, L SSB beams in different beam directions may be time-multiplexed into an SSB burst set (also referred to herein as an SSB burst), where L equals 4, 8, or 64. The SSB burst set is transmitted within an SSB burst time period 616. The SSB burst time period 616 may correspond, for example, to 5 ms. The SSB burst set is further transmitted with the SSB periodicity 618. For example, the SSB burst set may be transmitted within a 5 ms time period 616 every 20 ms. In some examples, the SSB burst set may be transmitted within either the first half or second half of a 10 ms frame.

Periodic transmission of the SSB consumes a significant amount of energy at the network entity. If there are no or very few UEs within a cell, the cell may expend energy unnecessarily by periodically sending SSBs in all directions. Therefore, in various aspects of the disclosure, the network entity may transmit SSBs either on-demand or with a higher periodicity (e.g., less frequently). In addition, the network entity may transmit a simple downlink reference signal, referred to herein as a discovery signal, more frequently to facilitate UE cell search.

Figure 7:
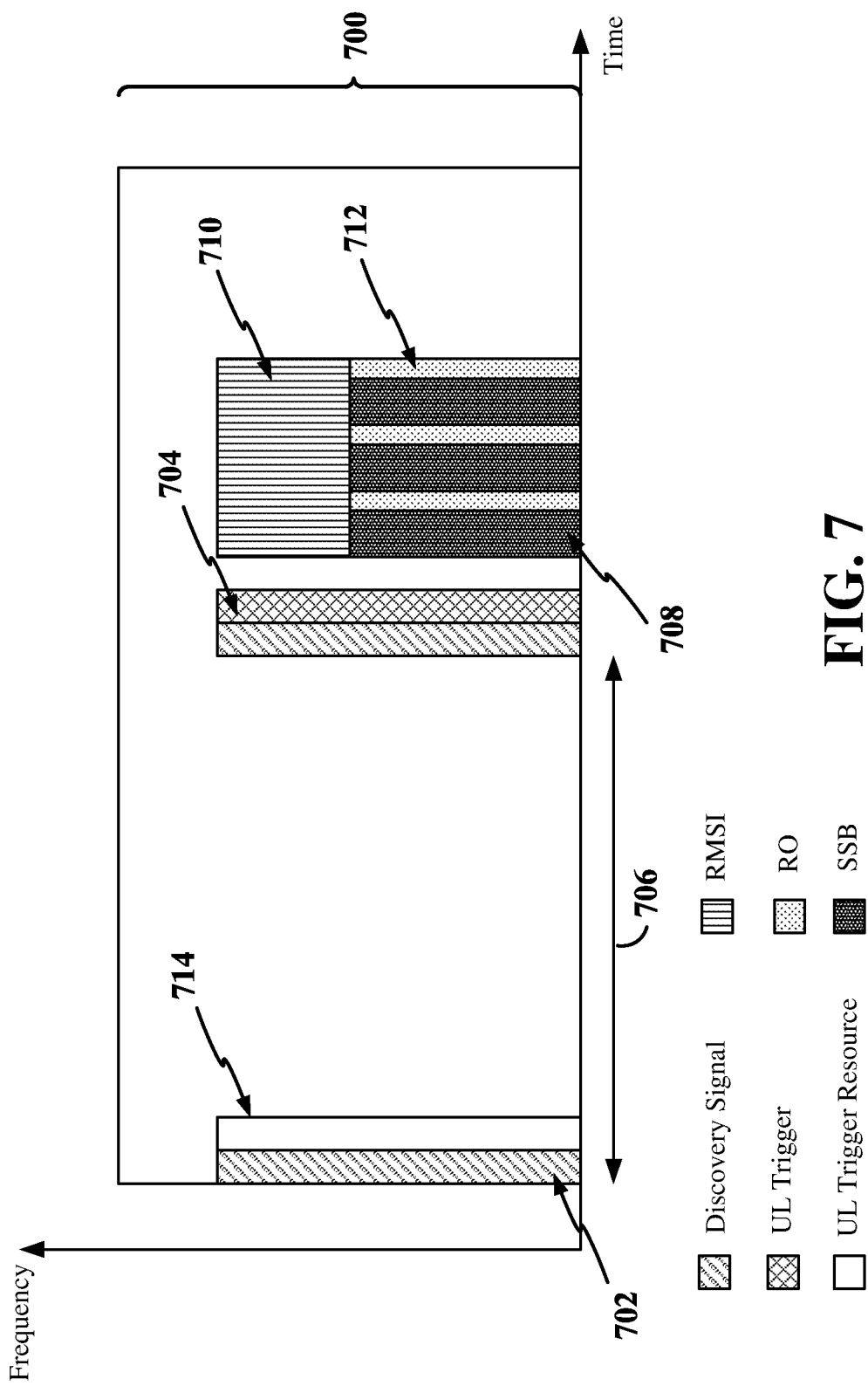
FIG. 7 is a diagram illustrating an exemplary on-demand system information technique according to some aspects.

FIG. 7 is a diagram illustrating an exemplary on-demand system information technique according to some aspects. In the example shown in FIG. 7, a discovery signal 702 may be transmitted with a discovery signal periodicity 706 (e.g., the discovery signal may be transmitted once per discovery signal period 706). The discovery signal periodicity 706 may be, for example, 20 ms or other suitable periodicity. In some examples, the discovery signal 702 may be transmitted as a discovery signal burst (e.g., as a plurality of discovery signals in different beam directions) within a discovery signal burst time period. The discovery signal burst may further be transmitted with the discovery signal periodicity 706. The discovery signal 702 enables a UE to discover the existence of a cell. However, the discovery signal 702 does not provide the PCI or other system information.

Therefore, upon receiving the discovery signal 702, a UE may request the network entity to provide system information for the cell by sending an uplink (UL) trigger 704. In some examples, the network entity may monitor for the UL trigger 704 from the UE requesting the system information within the discovery signal period 706. In other examples, the network entity may configure UL trigger resources 714 within each discovery signal period 706 for a UE to send the UL trigger 704. In some examples, the UE may send the UL trigger 704 within the configured UL trigger resources in an uplink beam-sweeping manner (e.g., as an UL trigger burst) to inform nearby cells of the presence of the UE. In the example shown in FIG. 4, an UL trigger is not received in the first UL trigger resource 714 in the first discovery signal period 706. However, an UL trigger 704 is received in the second UL trigger resource 714 following the second discovery signal 702 (e.g., in the second discovery signal period 706).

Upon receipt of an UL trigger 704, the network entity may transmit on-demand system information to the UE. For example, the network entity may transmit a plurality of SSBs 708 (e.g., within an SSB burst set). In addition, the network entity may further transmit RMSI (e.g., SIB1) 710 that provides a configuration of RACH occasions (ROs) 712 on which the UE may initiate a RACH procedure to obtain the remaining SIBs. By using an on-demand SSB technique, energy savings may be realized by the network entity. For example, for an arrival rate of 20 UEs per SSB period (e.g., 20 ms), on-demand SSB transmission consumes 7 units of power as compared to 17 units of power for periodic SSB transmission.

In some examples, on-demand SSBs may not be transmitted on synchronization rasters to avoid confusion by legacy UEs (e.g., UEs that are configured to receive periodic SSBs). Here, the synchronization raster indicates a center frequency that may be used by the UE to search for the SSB when explicit signaling of the SSB position is not present. Therefore, to simplify the initial search of discovery signals 702 and SSBs 708, the discovery signal 702 and the SSBs 708 may be transmitted within a same bandwidth part 700. In some examples, the UL trigger 704 may further be transmitted within the same bandwidth part 700. In other examples, the UL trigger 704 may be transmitted on a different bandwidth part.

In addition, the discovery signal 702 and the SSBs 708 may be transmitted on the same set of frequency resources (e.g., same/identical PRBs) or on overlapping sets of resources (e.g., overlapping PRBs) within the same bandwidth part 700, the former being illustrated. In examples in which the UL trigger 704 is transmitted within the same bandwidth part 700 as the discovery signal 702 and the SSBs 708, the UL trigger 704 may further be transmitted on the same set of frequency resources or an overlapping set of frequency resources with respect to the discovery signal 702 and the SSBs 708.

In examples in which the SSBs 708 are transmitted on an off-raster frequency, a cell supporting/transmitting on-demand SSBs may not be able to serve legacy UEs for initial access or for RRM. Therefore, the cell may be configured to serve legacy UEs as an SSB-less secondary serving cell (SCell), such as one of the SCells shown in FIG. 4. In this example, a PCell associated with the SCell may provide SSBs to the UE.

Figure 8:
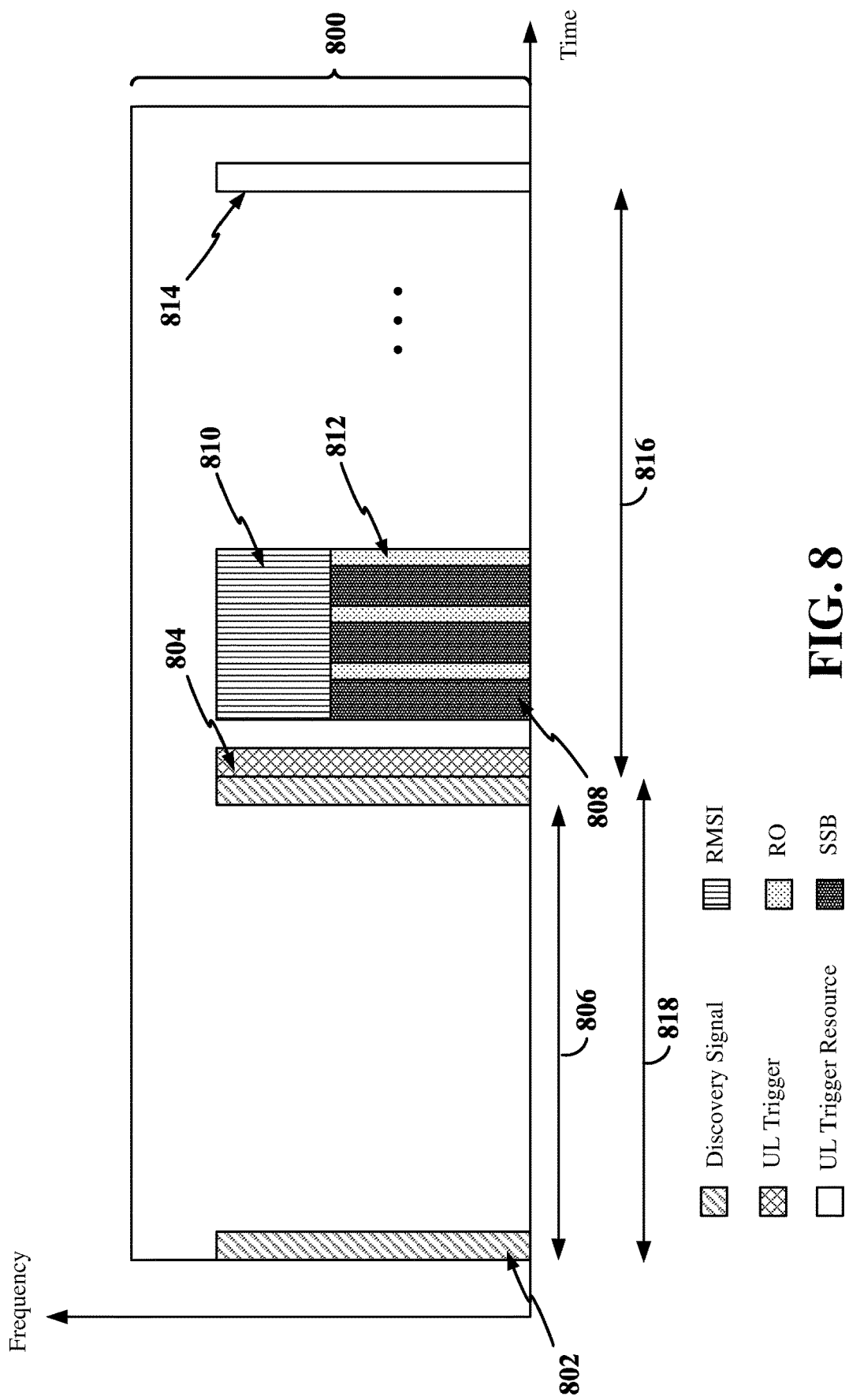
FIG. 8 is a diagram illustrating another exemplary on-demand system information technique according to some aspects.

FIG. 8 is a diagram illustrating another exemplary on-demand system information technique according to some aspects. In the example shown in FIG. 8, a discovery signal 802 may be transmitted with a discovery signal periodicity 806 (e.g., 20 ms or other suitable periodicity). In addition, the network entity may configure UL trigger resources 814 for a UE to send an UL trigger 804 to request system information.

Upon receipt of an UL trigger 804, the network entity may transmit on-demand system information to the UE. For example, the network entity may transmit a plurality of SSBs 808 (e.g., within an SSB burst set). In addition, the network entity may further transmit RMSI (e.g., SIB 1) 810 that provides a configuration of RACH occasions (ROs) 812 on which the UE may initiate a RACH procedure to obtain the remaining SIBs. In some examples, the discovery signal 802 and the SSBs 808 may be transmitted within a same bandwidth part 800. In some examples, the UL trigger 804 may further be transmitted within the same bandwidth part 800. In other examples, the UL trigger 804 may be transmitted on a different bandwidth part. In addition, the discovery signal 802 and the SSBs 808 may be transmitted on the same set of frequency resources (e.g., same/identical PRBs) or on overlapping sets of resources (e.g., overlapping PRBs) within the same bandwidth part 800, the former being illustrated. In examples in which the UL trigger 804 is transmitted within the same bandwidth part 800 as the discovery signal 802 and the SSBs 808, the UL trigger 804 may further be transmitted on the same set of frequency resources or an overlapping set of frequency resources with respect to the discovery signal 802 and the SSBs 808.

In some examples, the discovery signal may be transmitted as a discovery signal burst (e.g., as a plurality of discovery signals in different beam directions) within a discovery signal burst time period. The discovery signal burst may further be transmitted with the discovery signal periodicity 806. In addition, the UL trigger resource 814 may be configured as an UL trigger burst resource. In this example, as shown in FIG. 8, there may be a many-to-one mapping from the discovery signal burst 802 to the UL trigger burst 804. For example, the network entity may transmit a plurality of discovery signal bursts 802 within an UL trigger period 816. In this example, each of the discovery signal bursts 802 may include a burst offset 818 to a next UL trigger burst resource 814 (e.g., a next opportunity to transmit an UL trigger burst 804). In examples in which the discovery signal 802 is not transmitted as a discovery signal burst, the discovery signal 802 may include a symbol or slot offset to the corresponding UL trigger resource 814 (e.g., in examples in which the UL trigger resource is not an UL trigger burst resource) or UL trigger burst resource 814.

Figure 9:
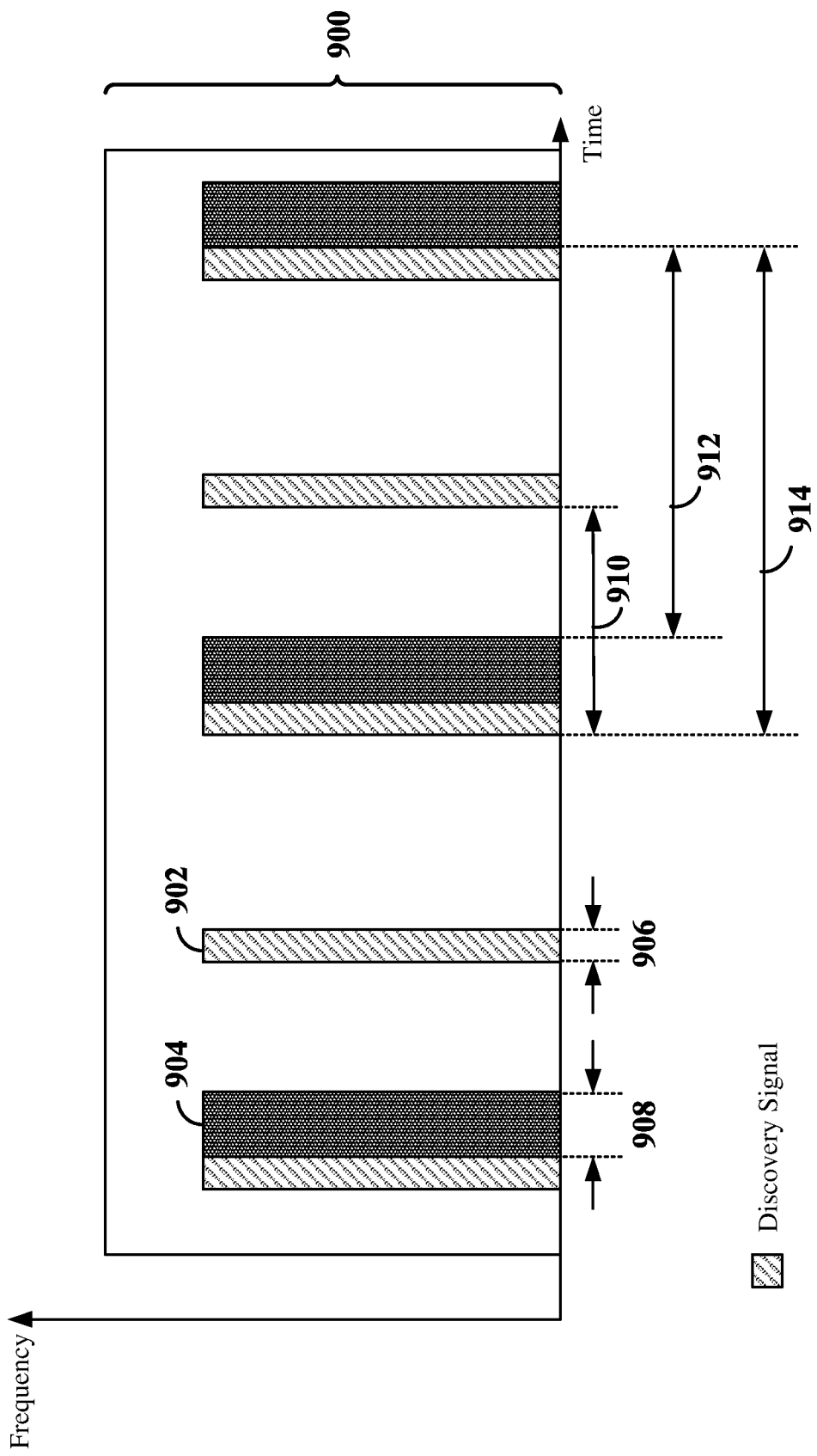
FIG. 9 is a diagram illustrating an exemplary reduced periodicity system information technique according to some aspects.

FIG. 9 is a diagram illustrating an exemplary reduced periodicity system information technique according to some aspects. In the example shown in FIG. 9, a discovery signal 902 may be transmitted with a discovery signal periodicity 910 (e.g., 20 ms or other suitable periodicity). In addition, an SSB 904 may be transmitted with an SSB periodicity 912 (e.g., 80 or 160 ms). The discovery signal periodicity 910 may be configured, for example, with a periodicity of P1, and the SSB periodicity 912 may be configured with a periodicity of k*P1, where k>1. In the example shown in FIG. 9, there is no uplink trigger, since the SSB is sent in a periodic manner.

In some examples, the discovery signal 902 and the SSBs 904 may be transmitted within a same bandwidth part 900. In addition, the discovery signal 902 and the SSBs 904 may be transmitted on the same set of frequency resources (e.g., same/identical PRBs) or on overlapping sets of resources (e.g., overlapping PRBs) within the same bandwidth part 900, the former being illustrated.

In some examples, the discovery signal 902 may be transmitted as a discovery signal burst (e.g., as a plurality of discovery signals in different beam directions) within a discovery signal burst time period 906. The discovery signal burst may further be transmitted with the discovery signal periodicity 910. In addition, the SSB 904 may be transmitted as an SSB burst within an SSB burst time period 908.

In this example, as shown in FIG. 9, there may be a many-to-one mapping from the discovery signal burst 902 to the SSB burst 904. For example, the network entity may transmit a plurality of discovery signal bursts 902 within the SSB period 912. In this example, each of the discovery signal bursts 902 may include a discovery signal burst index within the SSB period 912. For example, if the SSB period 912 is 40 ms and discovery signal period 910 is 20 ms, the discovery signal burst index may be either 0 or 1 (e.g., there are two discovery signal bursts sent within the SSB period 912). Including the discovery signal burst index in each discovery signal 902 can simplify the UE search for SSBs in examples in which the location of an SSB within an SSB period 912 is known. In other examples, each of the discovery signal bursts 902 may include a burst offset 914 to a next SSB burst 904. In examples in which the discovery signal 902 is not transmitted as a discovery signal burst, the discovery signal 902 may include a symbol or slot offset to the corresponding SSB (or SSB burst) 904.

In some examples, the SSBs 904 may be sent on an off-raster frequency. However, the cell supporting/sending SSBs 904 on an off-raster frequency may be configured to provide RRM for legacy UEs and initial access to other UEs. For example, the network entity may configure (e.g., via RRC signaling) legacy UEs with an SSB Measurement Time Configuration (SMTC) window aligned to the SSB periodicity 912 (e.g., 80 or 160 ms periodicity).

Figure 10:
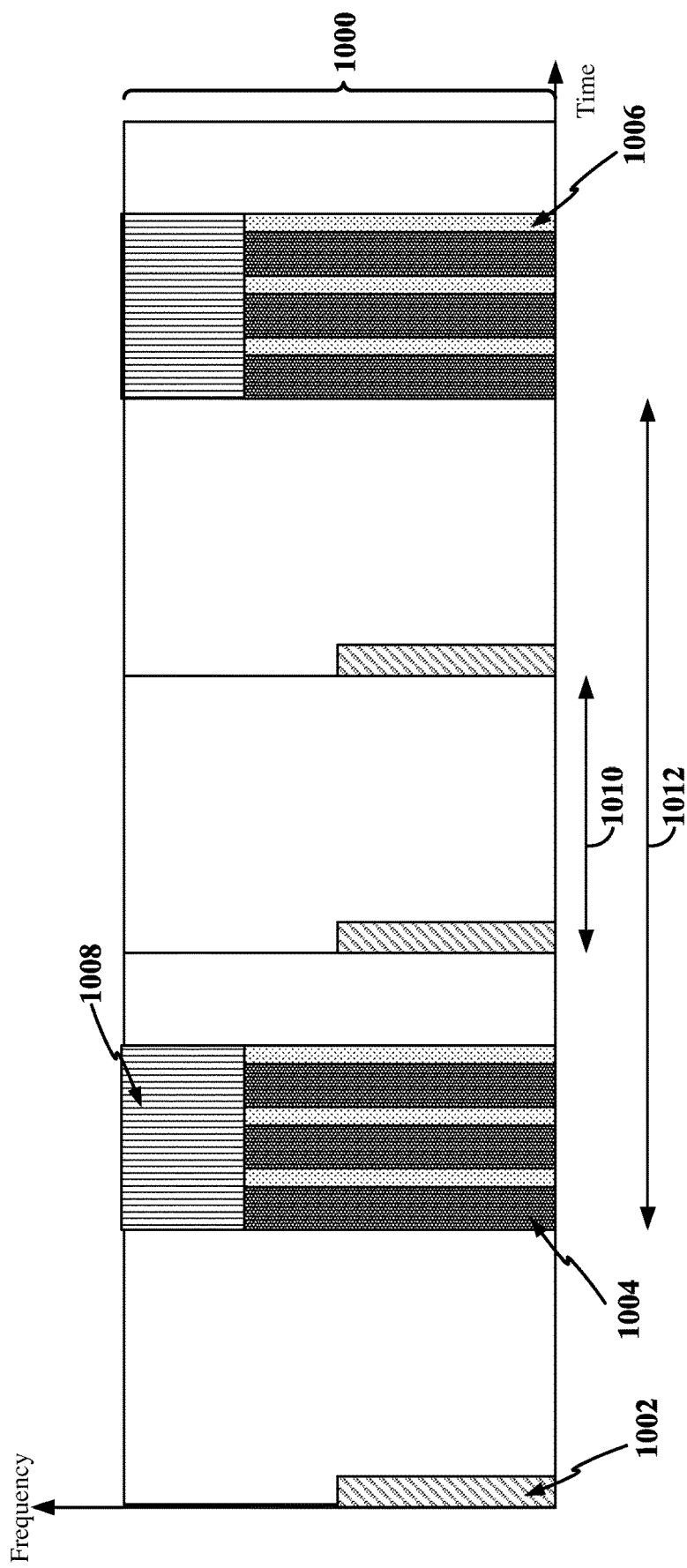
FIG. 10 is a diagram illustrating another exemplary reduced periodicity system information technique according to some aspects.

FIG. 10 is a diagram illustrating another exemplary reduced periodicity system information technique according to some aspects. In the example shown in FIG. 10, a discovery signal 1002 may be transmitted with a discovery signal periodicity 1010 (e.g., 20 ms or other suitable periodicity). In addition, an SSB 1004 may be transmitted with an SSB periodicity 1012 (e.g., 80 or 160 ms). The discovery signal periodicity 1010 may be configured, for example, with a periodicity of P1, and the SSB periodicity 1012 may be configured with a periodicity of k*P1, where k>1. In the example shown in FIG. 10, there is no uplink trigger, since the SSB is sent in a periodic manner.

In some examples, the discovery signal 1002 may be generated based on a PSS. In this example, as shown in FIG. 10, the discovery signal 1002 does not need to be transmitted in the discovery signal periods 1010 in which the SSB 1004 is present. For example, as shown in FIG. 10, in the second discovery signal period 1010, an SSB 1004 is transmitted in lieu of the discovery signal 1002. In addition, the UE may re-use legacy PSS-searching algorithms to detect the discovery signal 1002 or the SSB 1004. Depending on the PSS-searching algorithm used and to avoid confusion and reduce power consumption by UEs determining whether the detected signal is the discovery signal 1002 or the SSB 1004, the discovery signal 1002 may correspond to a PSS with a different PSS ID. For example, the discovery signal may include a first PSS associated with a first PSS ID and the SSB may include a second PSS associated with a second PSS ID different than the first PSS ID. As indicated above, the PSS may be associated with one of three possible PSS IDs (one of three M-sequences). The discovery signal PSS ID may be one of the three PSS IDs, and the SSB PSS ID may be another of the three PSS IDs.

In this example, a mapping between the discovery signal PSS ID and the SSB PSS ID may be pre-configured (e.g., via the original equipment manufacturer (OEM) based on one or more 3GPP standards or specification) or provided to the UE. For example, the network entity may transmit the mapping between the discovery signal (first) PSS ID and the SSB (second) PSS ID. In an example, the discovery signal 1002 may indicate the PSS ID for the upcoming SSB.

In some examples, the discovery signal 1002 and the SSBs 1004 may be transmitted within a same bandwidth part 1000. In addition, the discovery signal 1002 and the SSBs 1004 may be transmitted on the same set of frequency resources (e.g., same/identical PRBs) or on overlapping sets of resources (e.g., overlapping PRBs) within the same bandwidth part 1000, the latter being illustrated. For example, the discovery signal 1002 may include a number of subcarriers corresponding to a PSS, whereas the SSB may include a number of PRBs of the SSB.

In some examples, the discovery signal 1002 may be transmitted as a discovery signal burst (e.g., as a plurality of discovery signals in different beam directions) within a discovery signal burst time period. The discovery signal burst may further be transmitted with the discovery signal periodicity 1010. In addition, the SSB 1004 may be transmitted as an SSB burst within an SSB burst time period.

FIGS. 11A and 11B are diagrams illustrating an exemplary dynamically changing periodic system information technique according to some aspects. In the example shown in FIGS. 11A and 11B, a discovery signal 1102 may be transmitted with a discovery signal (first) periodicity 1108 (e.g., 10 ms, 20 ms or other suitable periodicity). In addition, the network entity may configure UL trigger resources 1104 for a UE to send an UL trigger to request a reduced periodicity of SSBs. For example, as shown in FIG. 11A, a plurality of SSBs 1106 may be transmitted with an initial (second) SSB periodicity 1110a (e.g., 80 or 160 ms) that is greater than the discovery signal (first) periodicity 1108. The discovery signal periodicity 1108 may be configured, for example, with a periodicity of P1, and the initial SSB periodicity 1110a may be configured with a periodicity of k*P1, where k>1.

As shown in FIG. 11B, upon receipt of an UL trigger 1112 within an UL trigger resource 1104, the network entity may begin transmitting SSBs 1106 with a reduced (third) SSB periodicity 1110b (e.g., 10 or 20 ms). For example, the initial SSB periodicity 1110a may be configured with a periodicity of k*P1 (where k>1), and the reduced SSB periodicity 1110b may be configured with a periodicity of (k*P1)/r, where r>1.

In some examples, the network entity may transmit the plurality of SSBs 1106 with the reduced (third) periodicity 1110b in a direction of the UE that sent the UL trigger 1112 or within an angular span encompassing the direction of the UE (e.g., on multiple beams associated with or near the direction of the UE).

In some examples, the discovery signal 1102 and the SSBs 1106 may be transmitted within a same bandwidth part 1100. In some examples, the UL trigger 1112 may further be transmitted within the same bandwidth part 1100 or on a different bandwidth part. In addition, the discovery signal 1102 and the SSBs 1106 may be transmitted on the same set of frequency resources (e.g., same/identical PRBs) or on overlapping sets of resources (e.g., overlapping PRBs) within the same bandwidth part 1100, the former being illustrated. In examples in which the UL trigger 1112 is transmitted within the same bandwidth part 1110, the UL trigger 1112 may further be transmitted on the same set of frequency resources or overlapping resources with respect to the discovery signal 1102 and the SSBs 1106.

In some examples, the discovery signal 1102 may be transmitted as a discovery signal burst (e.g., as a plurality of discovery signals in different beam directions) within a discovery signal burst time period. The discovery signal burst may further be transmitted with the discover signal periodicity 1108. In addition, the SSBs 1106 may be transmitted as an SSB burst within an SSB burst time period. Furthermore, the UL trigger 1112 may be transmitted as an UL trigger burst within an UL trigger burst time period.

Figure 12:
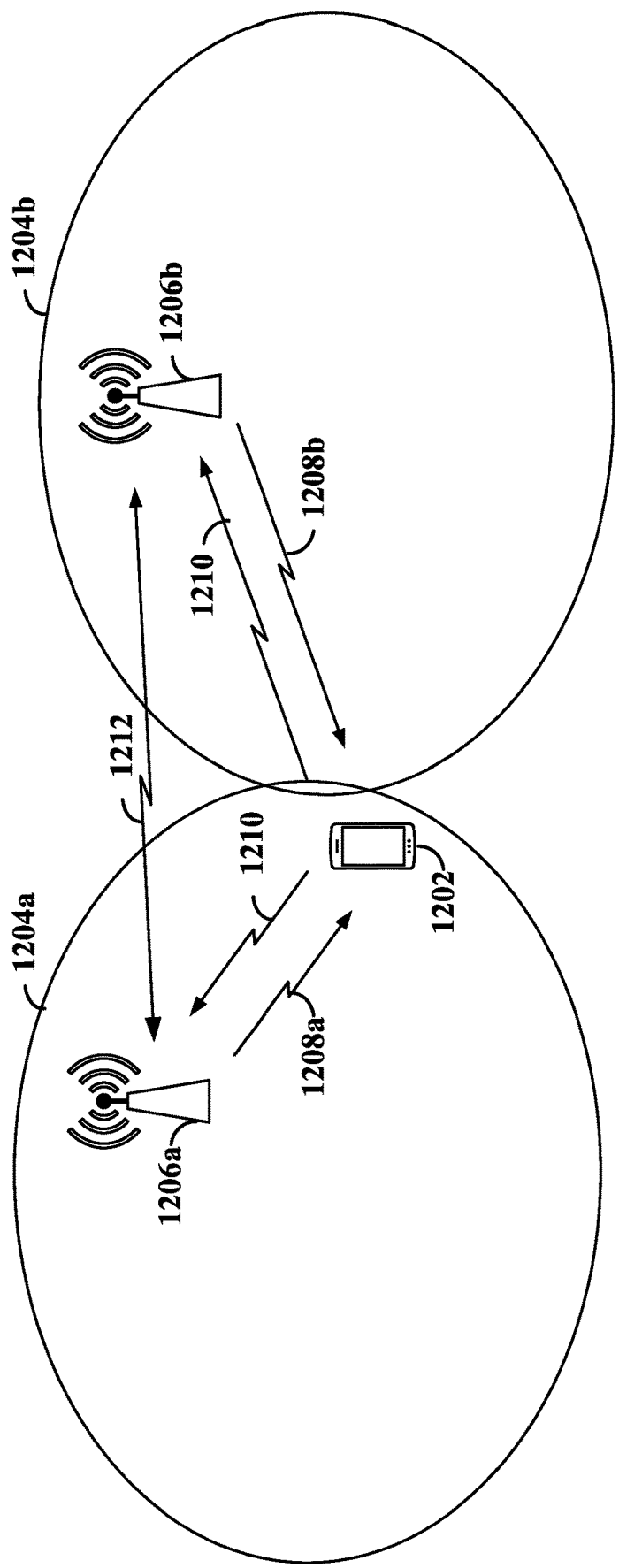
FIG. 12 is a diagram illustrating discovery signal transmission by multiple cells according to some aspects.

FIG. 12 is a diagram illustrating discovery signal transmission by multiple cells according to some aspects. In the example shown in FIG. 12, a UE 1202 is within the coverage area of a first cell 1204a served by a first network entity 1206a. Within the first cell 1204a, the UE 1202 may be a cell-edge UE, such that the UE may also receive signals from a second cell 1204b served by a second network entity 1206b. Each of the first network entity 1206a and second network entity 1206b may be implemented as an aggregated base station or a disaggregated base station. In a disaggregated base station architecture, each network entity 1206a and 1206b may include one or more of a central unit (CU), a distributed unit (DU), or a radio unit (RU). The UE 1202 may correspond, for example, to a UE or other scheduled node as shown in FIGS. 1 and/or 2.

The UE 1202 may be configured to receive first discovery signals 1208a from the first cell 1204a and second discovery signals 1208b from the second cell 1204b. In some examples, the first discovery signals 1208a and the second discovery signal 1208b may be the same (e.g., initiated with the same PSS ID) and may be sent on overlapping resources. Thus, the UE 1202 may receive a superposition of the discovery signals 1208a and 1208b and may transmit an uplink trigger 1210 (e.g., an uplink trigger burst in an uplink beam-sweeping manner) based on the superposition of the discovery signals 1208a and 1208b. In examples in which each of the network entities 1206a and 1206b has configured the same or overlapping windows for monitoring for the uplink trigger 1210 sent from the UE 1202, the uplink trigger 1210 may be received by each of the network entities 1206a and 1206b.

In some aspects, each network entity 1206a and 1206b may determine whether to transmit an on-demand SSB or to reduce the periodicity of SSBs based on the uplink trigger 1210. In some examples, each network entity 1206a and 1206b may obtain a respective measurement of the uplink trigger 1210 as received in each cell 1204a and 1204b. For example, network entity 1206a may obtain a first measurement of the uplink trigger 1210 and network entity 1206b may obtain a second measurement of the uplink trigger 1210. Each measurement may correspond, for example, to a reference signal received power (RSRP) or signal-to-interference-plus-noise ratio (SINR) of the uplink trigger 1210.

Each network entity 1206a and 1206b may further compare the uplink trigger measurement to a respective threshold to decide whether to respond to the uplink trigger (e.g., send an on-demand SSB or reduce the periodicity of SSBs). In some examples, network entity 1206b may decide to not respond (e.g., not transmit an on-demand SSB or reduce the periodicity of SSBs) in response to the uplink trigger measurement obtained at the network entity 1206b being less than the threshold. In addition, the network entity 1206a may decide to respond (e.g., to transmit an on-demand SSB or to reduce the periodicity of SSBs) in response to the uplink trigger measurement obtained at the network entity 1206a being greater than or equal to the threshold.

In other examples, the network entities 1206a and 1206b may delay responding (e.g., delay sending an on-demand SSB or reducing the SSB periodity) based on the respective uplink trigger measurements. For example, the network entity 1206b may delay transmission of the on-demand SSB or delay reducing the periodicity of SSBs in response to the uplink trigger measurement obtained at the network entity 1206b being less than the threshold. In addition, the network entity 1206a may decide to not delay transmission of the on-demand SSB or reduce the periodicity of SSBs in response to the uplink trigger measurement obtained at the network entity 1206a being greater than or equal to the threshold. In some examples, the network entities 1206a and 1206b may be configured with multiple thresholds and a mapping between each of the thresholds and a delay amount. For example, the delay amount may be set to 0 for the highest threshold (e.g., associated with a high RSRP or high SINR indicating the UE is near the cell-center), and delay amounts greater than 0 may be used for thresholds below the highest threshold. In some examples, instead of delay amounts, the thresholds may be mapped to different SSB periodicities. For example, a lowest SSB periodicity (e.g., 5 ms) may be mapped to the highest threshold (e.g., associated with a high RSRP or high SINR), and a highest SSB periodicity (e.g., 160 ms) may be mapped to the lowest threshold (e.g., associated with a low RSRP or low SINR indicating the UE is a cell-edge UE).

In some examples, the threshold(s) and related parameters (e.g., mapping between the threshold(s) and delay amounts and/or periodicities) may be pre-configured (e.g., via the original equipment manufacturer (OEM) based on one or more 3GPP standards or specification) or configured based on coordination with a radio access network (RAN) central unit (CU) or core network node, such as an Operation, Administration, and Maintenance (OAM) node.

In some aspects, the network entities 1206a and 1206b may communicate with one another to indicate a response of each cell 1204a and 1204b to the uplink trigger 1210. For example, the response may be to transmit an on-demand SSB to the UE 1202, reduce periodicity of the SSBs, delay the transmission of the SSB (or delay the reduction in SSB periodicity), or to select a particular periodicity of the SSBs. In some examples, the network entities 1206a and 1206b may communicate over the air (OTA) signals 1212 or backhaul signals (not specifically shown) including SSB transmission information in response to detecting the uplink trigger 1210. For example, the SSB transmission information may indicate the response to the uplink trigger (e.g., to transmit an on-demand SSB or reduce the SSB periodicity) by a network entity 1206a or 1206b. The SSB transmission information may further include one or more parameters, such as the signal strength (e.g., RSRP or SINR) of the detected uplink trigger 1210, a direction from which the uplink trigger 1210 was received from the UE 1202, the delay amount, the selected periodicity, and/or other suitable parameters related to the decision of whether to transmit an SSB (or reduce periodicity of SSBs) based on the uplink trigger 1210. In some examples, the signals 1212 may implicitly carry the SSB transmission information (e.g., via the resources used for transmission of the signals 1212 or an adjusted power of the signals 1212).

Figure 13:
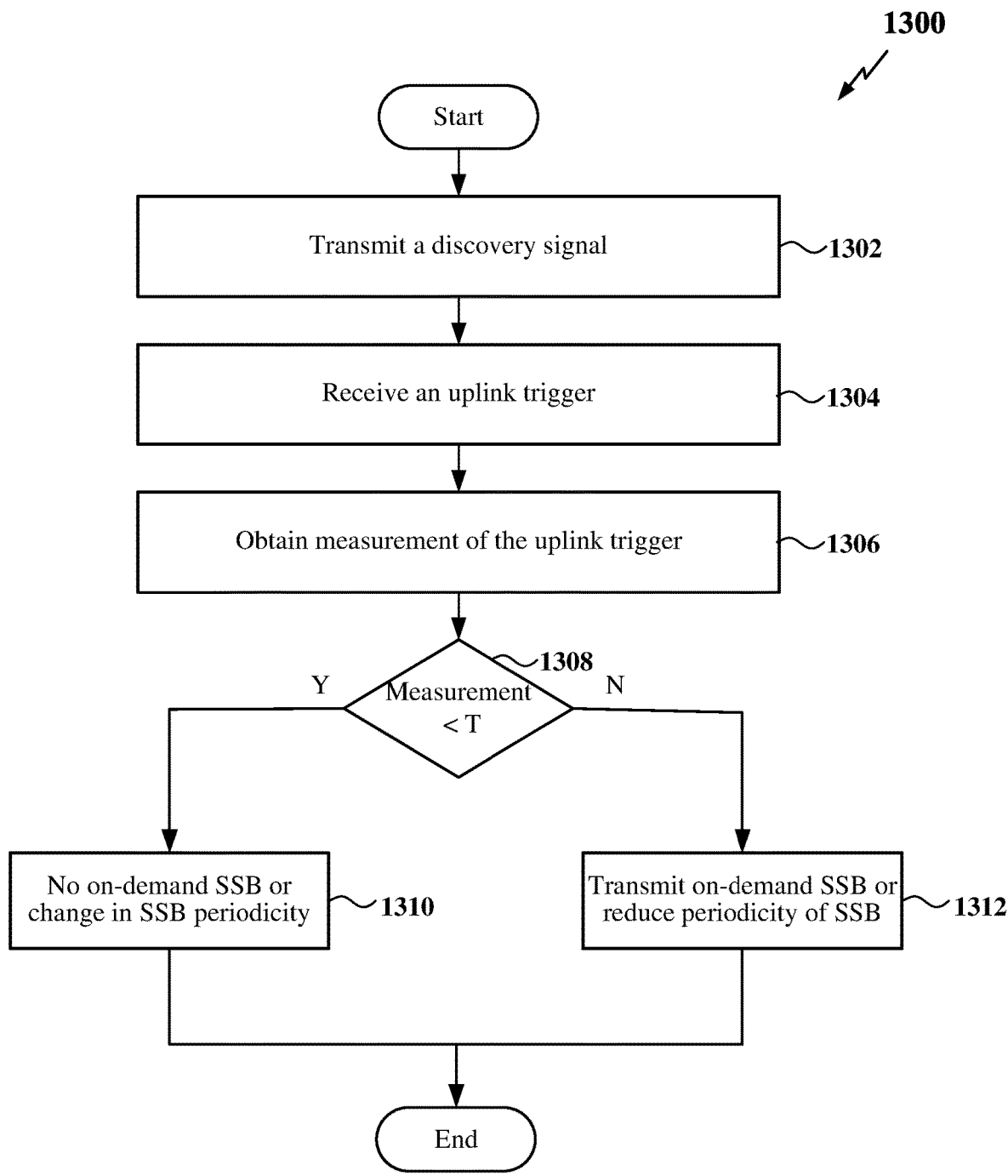
FIG. 13 is a flow chart illustrating an exemplary process for responding to an uplink trigger for SSB transmission according to some aspects.

FIG. 13 is a flow chart illustrating an exemplary process 1300 for responding to an uplink trigger for SSB transmission according to some aspects. As described below, some or all illustrated features may be omitted in a particular implementation within the scope of the present disclosure, and some illustrated features may not be required for implementation of all embodiments. In some examples, the process 1300 may be carried out by the network entity 1500 illustrated in FIG. 15. In some examples, the process 1300 may be carried out by any suitable apparatus or means for carrying out the functions or algorithm described below.

At block 1302, the network entity may transmit a discovery signal within a cell served by the network entity. The discovery signal may be, for example, a PSS initialized with a different PSS ID than SSBs transmitted by the cell. In some examples, the discovery signal may be transmitted within a same bandwidth part as SSBs within the cell, and may further be transmitted on a same set of frequency resources or an overlapping set of frequency resources with respect to SSBs. In some examples, the discovery signal may be transmitted at a first periodicity and the SSBs may be transmitted at a second periodicity greater than the first periodicity. In other examples, the discovery signal may be transmitted without periodic SSB transmission in the cell.

At block 1304, the network entity may receive an uplink trigger from the UE. The uplink trigger may be received, for example, within the same bandwidth part as the discovery signal and the SSBs. In addition, the uplink trigger may be received on the same or overlapping sets of frequency resources with respect to the discovery signal and the SSBs. The uplink trigger may request transmission of on-demand SSBs or may request a reduced periodicity of the SSBs.

At block 1306, the network entity may obtain a measurement of the uplink trigger. For example, the network entity may obtain the RSRP, SINR, or other suitable signal strength parameter of the uplink trigger.

At block 1308, the network entity may determine whether the measurement is less than a threshold (T). If the measurement is less than the threshold (Y branch of block 1308), at block 1310, the network entity may not respond to the uplink trigger. For example, the network entity may not transmit an on-demand SSB or change (reduce) the SSB periodicity. If the measurement is greater than or equal to the threshold (N branch of block 1308), at block 1312, the network entity may transmit an on-demand SSB or reduce the periodicity of SSBs. In some examples, the network entity may further communicate with at least one additional network entity to indicate a response to the uplink trigger based on the measurement. In some examples, the network entity may transmit a signal carrying the indication of the response and one or more parameters related to the response to the at least one additional network entity.

Figure 14:
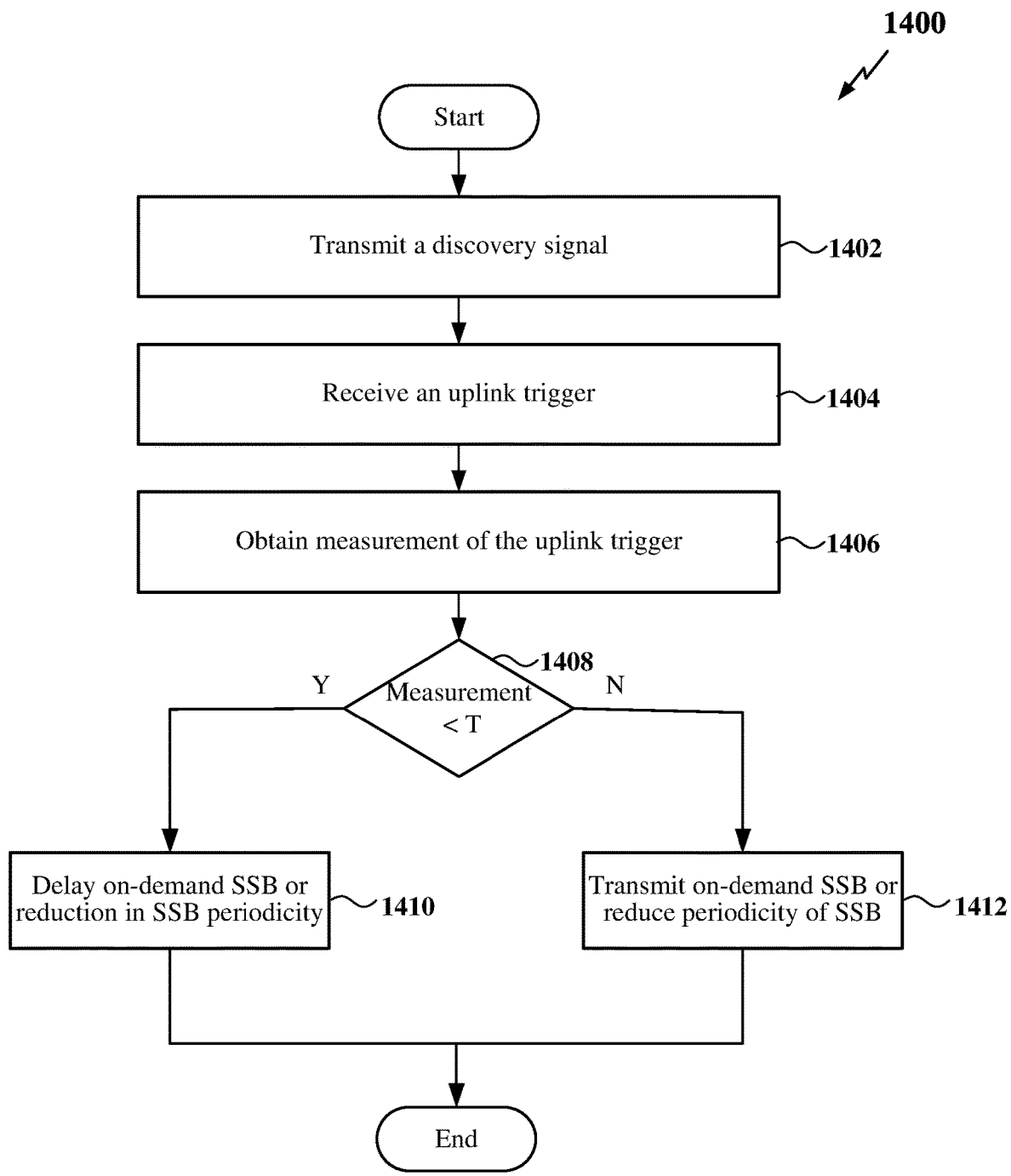
FIG. 14 is a flow chart illustrating another exemplary process for responding to an uplink trigger for SSB transmission according to some aspects.

FIG. 14 is a flow chart illustrating another exemplary process 1400 for responding to an uplink trigger for SSB transmission according to some aspects. As described below, some or all illustrated features may be omitted in a particular implementation within the scope of the present disclosure, and some illustrated features may not be required for implementation of all embodiments. In some examples, the process 1400 may be carried out by the network entity 1500 illustrated in FIG. 15. In some examples, the process 1400 may be carried out by any suitable apparatus or means for carrying out the functions or algorithm described below.

At block 1402, the network entity may transmit a discovery signal within a cell served by the network entity. The discovery signal may be, for example, a PSS initialized with a different PSS ID than SSBs transmitted by the cell. In some examples, the discovery signal may be transmitted within a same bandwidth part as SSBs within the cell, and may further be transmitted on a same set of frequency resources or an overlapping set of frequency resources with respect to SSBs. In some examples, the discovery signal may be transmitted at a first periodicity and the SSBs may be transmitted at a second periodicity greater than the first periodicity. In other examples, the discovery signal may be transmitted without periodic SSB transmission in the cell.

At block 1404, the network entity may receive an uplink trigger from the UE. The uplink trigger may be received, for example, within the same bandwidth part as the discovery signal and the SSBs. In addition, the uplink trigger may be received on the same or overlapping sets of frequency resources with respect to the discovery signal and the SSBs. The uplink trigger may request transmission of on-demand SSBs or may request a reduced periodicity of the SSBs.

At block 1406, the network entity may obtain a measurement of the uplink trigger. For example, the network entity may obtain the RSRP, SINR, or other suitable signal strength parameter of the uplink trigger.

At block 1408, the network entity may determine whether the measurement is less than a threshold (T). If the measurement is less than the threshold (Y branch of block 1408), at block 1410, the network entity may delay transmission of an on-demand SSB or reduction in the SSB periodicity by a delay amount based on the measurement. In some examples, the threshold may include a plurality of thresholds, each mapped to a respective delay amount. If the measurement is greater than or equal to the threshold (N branch of block 1408), at block 1412, the network entity may transmit an on-demand SSB or reduce the periodicity of SSBs. In some examples, the network entity may further communicate with at least one additional network entity to indicate a response to the uplink trigger based on the measurement. In some examples, the network entity may transmit a signal carrying the indication of the response and one or more parameters related to the response to the at least one additional network entity.

Figure 15:
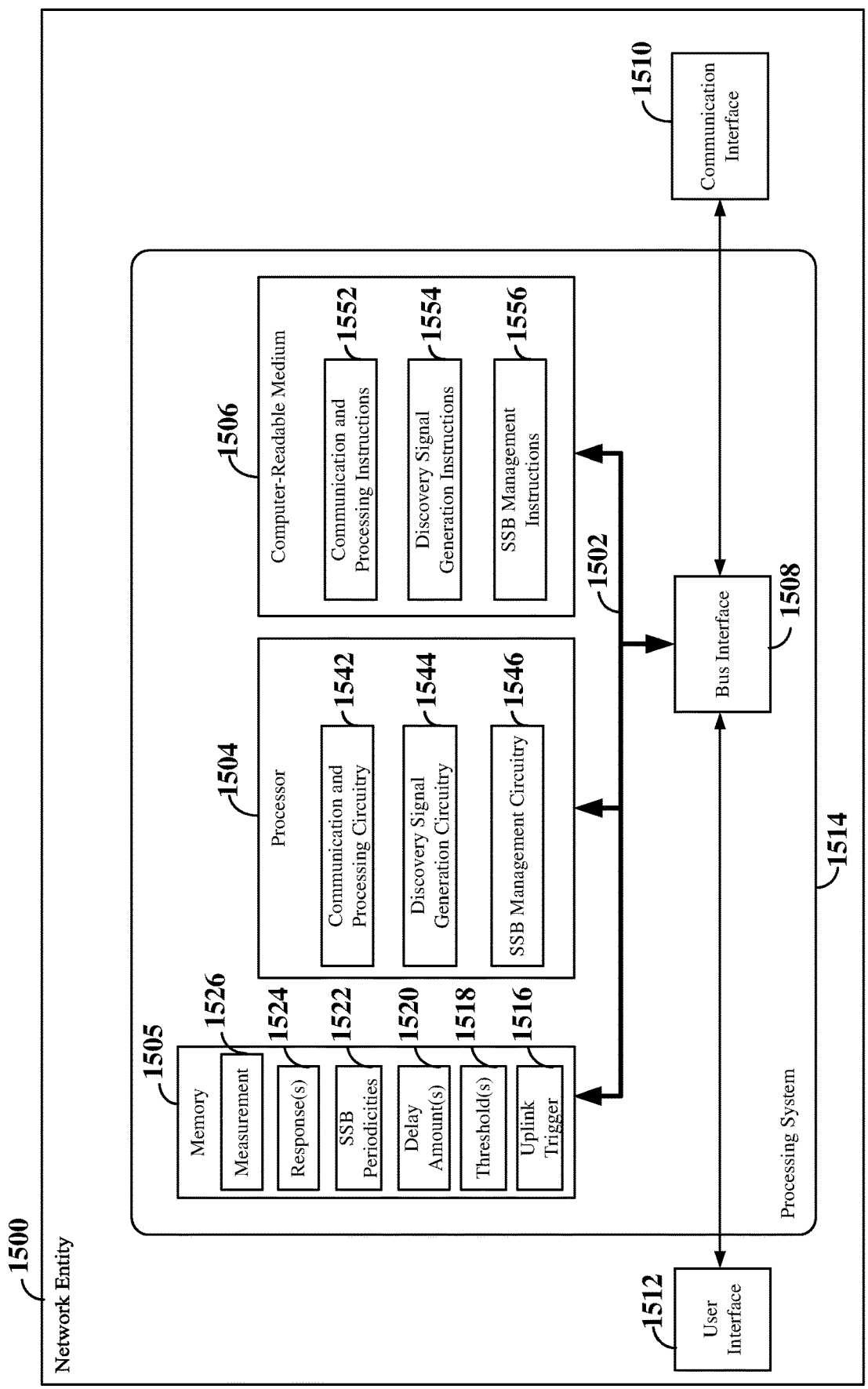
FIG. 15 is a block diagram illustrating an example of a hardware implementation for a network entity employing a processing system according to some aspects.

FIG. 15 is a block diagram illustrating an example of a hardware implementation of a network entity 1500 employing a processing system 1514 according to some aspects. The network entity 1500 may be, for example, any base station (e.g., gNB, eNB) or other scheduling entity as illustrated in any one or more of FIGS. 1, 2, 4, and/or 12. The network entity 1500 may further be implemented in an aggregated or monolithic base station architecture, or in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC.

In accordance with various aspects of the disclosure, an element, or any portion of an element, or any combination of elements may be implemented with a processing system 1514 that includes one or more processors, such as processor 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network entity 1500 may be configured to perform any one or more of the functions described herein. That is, the processor 1504, as utilized in the network entity 1500, may be used to implement any one or more of the methods or processes described and illustrated, for example, in FIGS. 13-14 and/or 16-19.

The processor 1504 may in some instances be implemented via a baseband or modem chip and in other implementations, the processor 1504 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits, including one or more processors (represented generally by the processor 1504), a memory 1505, and computer-readable media (represented generally by the computer-readable medium 1506). The bus 1502 may also link various other circuits such as timing sources, peripherals, voltage regulators, and power management circuits, which are well known in the art, and therefore, are not described any further.

A bus interface 1508 provides an interface between the bus 1502 and a communication interface 1510. The communication interface 1510 provides a means for communicating with various other apparatus over a transmission medium. For example, the communication interface 1510 may provide an interface (e.g., wireless or wired) between the network entity 1500 and a plurality of transmission and reception points (TRPs), a core network node, and/or a plurality of UEs. In some examples, the communication interface 1510 may include a wireless transceiver. The bus interface 1508 further provides an interface between the bus 1502 and a user interface 1512 (e.g., keypad, display, touch screen, speaker, microphone, control features, etc.). Of course, such a user interface 1512 may be omitted in some examples.

The computer-readable medium 1506 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1506 may reside in the processing system 1514, external to the processing system 1514, or distributed across multiple entities including the processing system 1514. The computer-readable medium 1506 may be embodied in a computer program product. By way of example, a computer program product may include a computer-readable medium in packaging materials. In some examples, the computer-readable medium 1506 may be part of the memory 1505. Those skilled in the art will recognize how best to implement the described functionality presented throughout this disclosure depending on the particular application and the overall design constraints imposed on the overall system. In some examples, the computer-readable medium 1506 may be implemented on an article of manufacture, which may further include one or more other elements or circuits, such as the processor 1504 and/or memory 1505.

The computer-readable medium 1506 may store computer-executable code (e.g., software). Software shall be construed broadly to mean instructions, instruction sets, code, code segments, program code, programs, subprograms, software modules, applications, software applications, software packages, routines, subroutines, objects, executables, threads of execution, procedures/processes, functions, etc., whether referred to as software, firmware, middleware, microcode, hardware description language, or otherwise.

One or more processors, such as processor 1504, may be responsible for managing the bus 1502 and general processing, including the execution of the software (e.g., instructions or computer-executable code) stored on the computer-readable medium 1506. The software, when executed by the processor 1504, causes the processing system 1514 to perform the various processes and functions described herein for any particular apparatus. The computer-readable medium 1506 and/or the memory 1505 may also be used for storing data that may be manipulated by the processor 1504 when executing software. For example, the memory 1505 may store one or more of an uplink trigger 1516, threshold(s) 1518, delay amount(s) 1520, SSB periodicities 1522, response(s) 1524 to the uplink trigger 1516 sent to or received from other network entities, and/or a measurement 1526 of the uplink trigger 1516.

In some aspects of the disclosure, the processor 1504 may include circuitry configured for various functions. For example, the processor 1504 may include communication and processing circuitry 1542 configured to communicate with a network entity (e.g., an aggregated or disaggregated base station, such as a gNB or eNB). In some examples, the communication and processing circuitry 1542 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1542 may include one or more transmit/receive chains. The communication and processing circuitry 1542 may further be configured to execute communication and processing software 1552 stored on the computer-readable medium 1506 to implement one or more functions described herein.

In some implementations where the communication involves receiving information, the communication and processing circuitry 1542 may obtain information from a component of the network entity 1500 (e.g., from the communication interface 1510 that receives the information via radio frequency signaling or some other type of signaling suitable for the applicable communication medium), process (e.g., decode) the information, and output the processed information. For example, the communication and processing circuitry 1542 may output the information to another component of the processor 1504, to the memory 1505, or to the bus interface 1508. In some examples, the communication and processing circuitry 1542 may receive one or more of signals, messages, other information, or any combination thereof. In some examples, the communication and processing circuitry 1542 may receive information via one or more channels. In some examples, the communication and processing circuitry 1542 may include functionality for a means for receiving. In some examples, the communication and processing circuitry 1542 may include functionality for a means for processing, including a means for demodulating, a means for decoding, etc.

In some implementations where the communication involves sending (e.g., transmitting) information, the communication and processing circuitry 1542 may obtain information (e.g., from another component of the processor 1504, the memory 1505, or the bus interface 1508), process (e.g., modulate, encode, etc.) the information, and output the processed information. For example, the communication and processing circuitry 1542 may output the information to the communication interface 1510 (e.g., that transmits the information via radio frequency signaling or some other type of signaling suitable for the applicable communication medium). In some examples, the communication and processing circuitry 1542 may send one or more of signals, messages, other information, or any combination thereof. In some examples, the communication and processing circuitry 1542 may send information via one or more channels. In some examples, the communication and processing circuitry 1542 may include functionality for a means for sending (e.g., a means for transmitting). In some examples, the communication and processing circuitry 1542 may include functionality for a means for generating, including a means for modulating, a means for encoding, etc.

The communication and processing circuitry 1542 may further be configured to provide (e.g., via the communication interface 1510) a discovery signal on a first set of frequency resources within a bandwidth part to facilitate discovery of a cell associated with the network entity 1500. The communication and processing circuitry 1542 may further be configured to provide an SSB on a second set of frequency resources within the bandwidth part to provide a cell ID of the cell. The second set of frequency resources at least partially overlapping the first set of frequency resources. In some examples, the second set of frequency resources may be identical to the first set of frequency resources.

In some examples, the communication and processing circuitry 1542 may be configured to transmit a plurality of discovery signal bursts within an SSB period. In some examples, the communication and processing circuitry 1542 may be configured to transmit a plurality of discovery signals at a first periodicity and to transmit a plurality of SSBs at a second periodicity greater than the first periodicity on an off-raster frequency.

In some examples, the discovery signal may include a first PSS associated with a first PSS ID and the SSB may include a second PSS associated with a second, different PSS ID. In this example, the communication and processing circuitry 1542 may be configured to provide a mapping between the first PSS ID and the second PSS ID.

The communication and processing circuitry 1542 may further be configured to receive an uplink trigger 1516 associated with transmission of the SSB from a user equipment (UE). In some examples, the uplink trigger 1516 is received on a third set of frequency resources within the bandwidth part that at least partially overlaps the first set of frequency resources and the second set of frequency resources. In some examples, the communication and processing circuitry 1542 may be configured to transmit the SSB on-demand in response to the uplink trigger 1516. In some examples, the SSB is transmitted on an off-raster frequency. In this example, the cell served by the network entity may be a secondary serving cell for the UE.

The communication and processing circuitry 1542 may further be configured to transmit a plurality of discovery signals at a first periodicity, transmit a first plurality of SSBs at a second periodicity (one of the SSB periodicities 1522) greater than the first periodicity, and transmit a second plurality of SSBs at a third periodicity (another of the SSB periodicities 1522) less than the second periodicity in response to receiving the uplink trigger. For example, the communication and processing circuitry 1542 may further be configured to transmit the second plurality of SSBs in a direction of the UE (e.g., using one or more directional beams). In some examples, the communication and processing circuitry 1542 may be configured to transmit a plurality of discovery signal bursts within an uplink trigger (ULT) period.

The communication and processing circuitry 1542 may further be configured to communicate with at least one additional network entity to indicate a response 1524 to the uplink trigger 1516 based on a measurement of the uplink trigger 1516. In some examples, the communication and processing circuitry 1542 may be configured to transmit a signal carrying the indication of the response and one or more parameters related to the response to the at least one additional network entity. The communication and processing circuitry 1542 may further be configured to receive one or more responses 1524 from one or more additional network entities to coordinate uplink trigger responses. The communication and processing circuitry 1542 may further be configured to execute communication and processing instructions (software) stored on the computer-readable medium 1506 to implement one or more of the functions described here.

The processor 1504 may further include discovery signal generation circuitry 1544, configured to generate the discovery signal for transmission via the communication and processing circuitry 1542. The discovery signal generation circuitry 1544 may be configured to generate the discovery signal on the first set of frequency resources, which may be the same as, or overlapping with respect to the second set of frequency resources. The discovery signal generation circuitry 1544 may further be configured to generate a plurality of discovery signal bursts within an SSB period. In some examples, each of the discovery signal bursts may include a respective discovery signal burst index identifying the respective discovery signal burst within the SSB period. In other examples, each of the discovery signal bursts within the SSB period may include a burst offset of a next SSB burst.

The discovery signal generation circuitry 1544 may further generate the discovery signal as the first PSS associated with the first PSS ID that is different than the second PSS associated with the second PSS ID of the SSB. The discovery signal generation circuitry 1544 may further be configured to generate the mapping between the first PSS ID and the second PSS ID. In some examples, the discovery signal generation circuitry 1544 may generate the discovery signal including an offset to the uplink trigger.

The discovery signal generation circuitry 1544 may further be configured to operate together with the communication and processing circuitry 1542 to transmit a plurality of discovery signals at the first periodicity. The discovery signal generation circuitry 1544 may further be configured to operate together with the communication and processing circuitry 1542 to transmit a plurality of discovery signal bursts within the ULT period. In this example, each of the plurality of discovery signal bursts may include a burst offset to a next ULT burst. The discovery signal generation circuitry 1544 may further be configured to execute discovery signal generation instructions (software) 1554 stored on the computer-readable medium 1506 to implement one or more functions described herein.

The processor 1504 may further include SSB management circuitry 1546, configured to manage the transmission of SSBs within a cell served by the network entity 1500. The SSB management circuitry 1546 may further be configured to generate the SSB for transmission by the communication and processing circuitry 1542 on the second set of frequency resources within the bandwidth part. In some examples, the SSB management circuitry 1546 may further be configured to generate the SSB with the second PSS associated with the second PSS ID. The SSB management circuitry 1546 may further be configured to operate together with the communication and processing circuitry 1542 to transmit the plurality of SSBs at the second periodicity on an off-raster frequency.

The SSB management circuitry 1546 may further be configured to generate an on-demand SSB for transmission via the communication and processing circuitry 1542 in response to the uplink trigger 1516. For example, the SSB management circuitry 1546 may be configured to operate together with the communication and processing circuitry 1542 to transmit the on-demand SSB on an off-raster frequency in examples in which the cell is a secondary serving cell for the UE.

The SSB management circuitry 1546 may further be configured to reduce the periodicity of the SSB transmission from the second periodicity to the third periodicity (based on the SSB periodicities 1522) in response to receiving the uplink trigger. In addition, the SSB management circuitry 1546 may be configured to operate together with the communication and processing circuitry 1542 to transmit the second plurality of SSBs at the third periodicity in a direction of the UE.

The SSB management circuitry 1546 may further be configured to obtain a measurement 1526 of the uplink trigger 1516. For example, the SSB management circuitry 1546 may be configured to obtain an RSRP, SINR, or other signal strength measurement of the uplink trigger 1516. The SSB management circuitry 1546 may further be configured to compare the measurement 1526 to one or more threshold(s) 1518. In some examples, the SSB management circuitry 1546 may be configured to transmit the SSB in response to the measurement 1526 of the uplink trigger being greater than or equal to a threshold 1518. In some examples, the SSB management circuitry 1546 may be configured to delay transmission of the SSB in response to the measurement 1526 of the uplink trigger 1516 being less than the threshold 1518. In some examples, the SSB management circuitry 1546 may be configured to delay transmission of the SSB by a delay amount 1520 based on a mapping between the measurement 1526 and the delay amount 1520 based on the threshold(s) 1518. In some examples, the SSB management circuitry 1546 may be configured to reduce a periodicity of the SSBs based on a mapping between the measurement 1526 and the SSB periodicities 1522 based on the threshold(s) 1518.

The SSB management circuitry 1546 may further be configured to generate a signal indicating a response 1524 to the uplink trigger for transmission to at least one additional network entity via the communication and processing circuitry 1542. In addition, the SSB management circuitry 1546 may further be configured to generate one or more parameters (e.g., the measurement 1526 of the detected uplink trigger 1516, a direction from which the uplink trigger 1516 was received from the UE2, the delay amount, the selected periodicity, and/or other suitable parameters) for transmission with the response 1524 in the signal to the additional network entities. In some examples, the response and/or parameters may be explicitly included in the signal or implicitly indicated by the signal. The SSB management circuitry 1546 may further be configured to execute SSB management instructions (software) 1556 stored on the computer-readable medium 1506 to implement one or more functions described herein.

Figure 16:
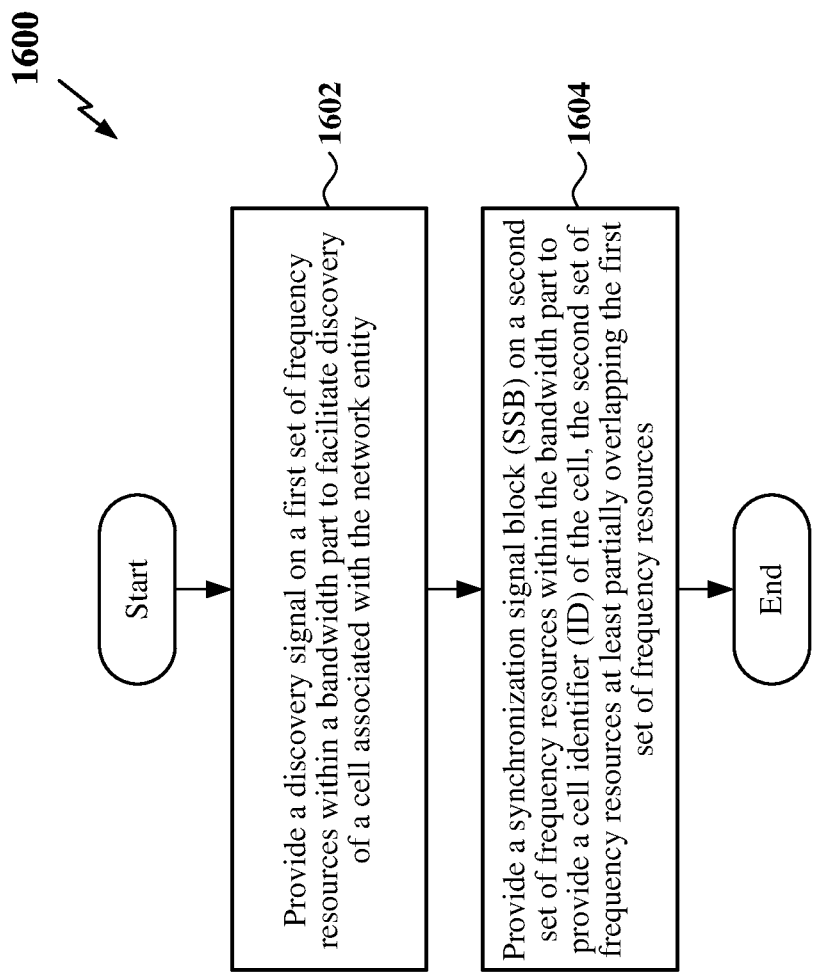
FIG. 16 is a flow chart illustrating an exemplary process for reduced SSB transmission according to some aspects.

FIG. 16 is a flow chart illustrating an exemplary process 1600 for reduced SSB transmission according to some aspects. As described below, some or all illustrated features may be omitted in a particular implementation within the scope of the present disclosure, and some illustrated features may not be required for implementation of all embodiments. In some examples, the process 1600 may be carried out by the network entity 1500 illustrated in FIG. 15. In some examples, the process 1600 may be carried out by any suitable apparatus or means for carrying out the functions or algorithm described below.

At block 1602, the network entity may provide a discovery signal on a first set of frequency resources within a bandwidth part to facilitate discovery of a cell associated with the network entity. In some examples, the network entity may transmit a plurality of discovery signal bursts within an SSB period. In this example, each of the plurality of discovery signal bursts includes a respective discovery signal burst index identifying the respective discovery signal burst within the SSB period. In other examples, each of the plurality of discovery signal bursts within the SSB period includes a burst offset to a next SSB burst. For example, the communication and processing circuitry 1542, together with the discovery signal generation circuitry 1544 and communication interface 1510, shown and described above in connection with FIG. 15, may provide a means to provide the discovery signal.

At block 1604, the network entity may provide a synchronization signal block (SSB) on a second set of frequency resources within the bandwidth part to provide a cell identifier (ID) of the cell, the second set of frequency resources at least partially overlapping the first set of frequency resources. In some examples, the first set of frequency resources is identical to the second set of frequency resources. In some examples, the discovery signal includes a first primary synchronization signal (PSS) associated with a first PSS identifier (ID) and the SSB includes a second PSS associated with a second PSS ID different than the first PSS ID. In this example, the network entity may further provide a mapping between the first PSS ID and the second PSS ID. For example, the communication and processing circuitry 1542, together with the SSB management circuitry 1546 and communication interface 1510, shown and described above in connection with FIG. 15, may provide a means to provide the SSB.

Figure 17:
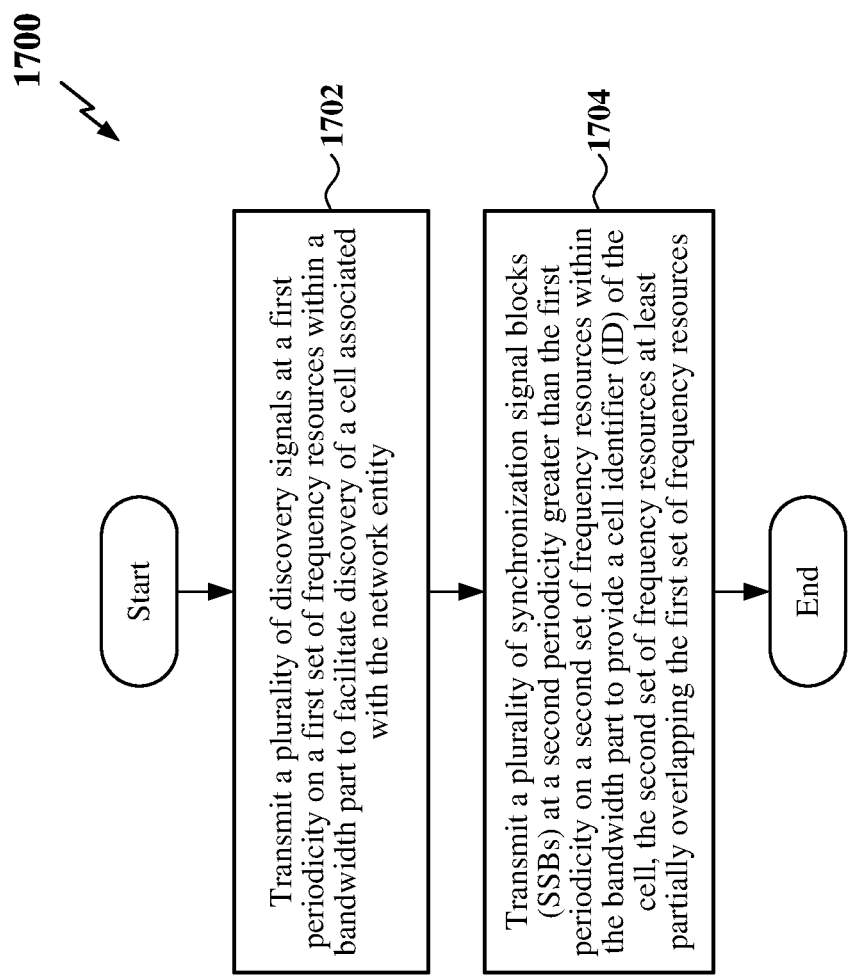
FIG. 17 is a flow chart illustrating another exemplary process for reduced SSB transmission according to some aspects.

FIG. 17 is a flow chart illustrating another exemplary process 1700 for reduced SSB transmission according to some aspects. As described below, some or all illustrated features may be omitted in a particular implementation within the scope of the present disclosure, and some illustrated features may not be required for implementation of all embodiments. In some examples, the process 1700 may be carried out by the network entity 1500 illustrated in FIG. 15. In some examples, the process 1700 may be carried out by any suitable apparatus or means for carrying out the functions or algorithm described below.

At block 1702, the network entity may transmit a plurality of discovery signals at a first periodicity on a first set of frequency resources within a bandwidth part to facilitate discovery of a cell associated with the network entity. In some examples, the network entity may transmit a plurality of discovery signal bursts within an SSB period. In this example, each of the plurality of discovery signal bursts includes a respective discovery signal burst index identifying the respective discovery signal burst within the SSB period. In other examples, each of the plurality of discovery signal bursts within the SSB period includes a burst offset to a next SSB burst. For example, the communication and processing circuitry 1542, together with the discovery signal generation circuitry 1544 and communication interface 1510, shown and described above in connection with FIG. 15, may provide a means to transmit the plurality of discovery signals.

At block 1704, the network entity may transmit a plurality of SSBs at a second periodicity greater than the first periodicity on a second set of frequency resources within the bandwidth part to provide a cell identifier (ID) of the cell, the second set of frequency resources at least partially overlapping the first set of frequency resources. In some examples, the first set of frequency resources is identical to the second set of frequency resources. In some examples, each of the discovery signals includes a first primary synchronization signal (PSS) associated with a first PSS identifier (ID) and each of the SSBs includes a second PSS associated with a second PSS ID different than the first PSS ID. In this example, the network entity may further provide a mapping between the first PSS ID and the second PSS ID.

In some examples, the network entity may transmit the plurality of SSBs on an off-raster frequency to enable radio resource management (RRM) for a user equipment (UE) within an SSB measurement timing configuration (SMTC) window aligned to the second periodicity. For example, the communication and processing circuitry 1542, together with the SSB management circuitry 1546 and communication interface 1510, shown and described above in connection with FIG. 15, may provide a means to transmit the plurality of SSBs.

Figure 18:
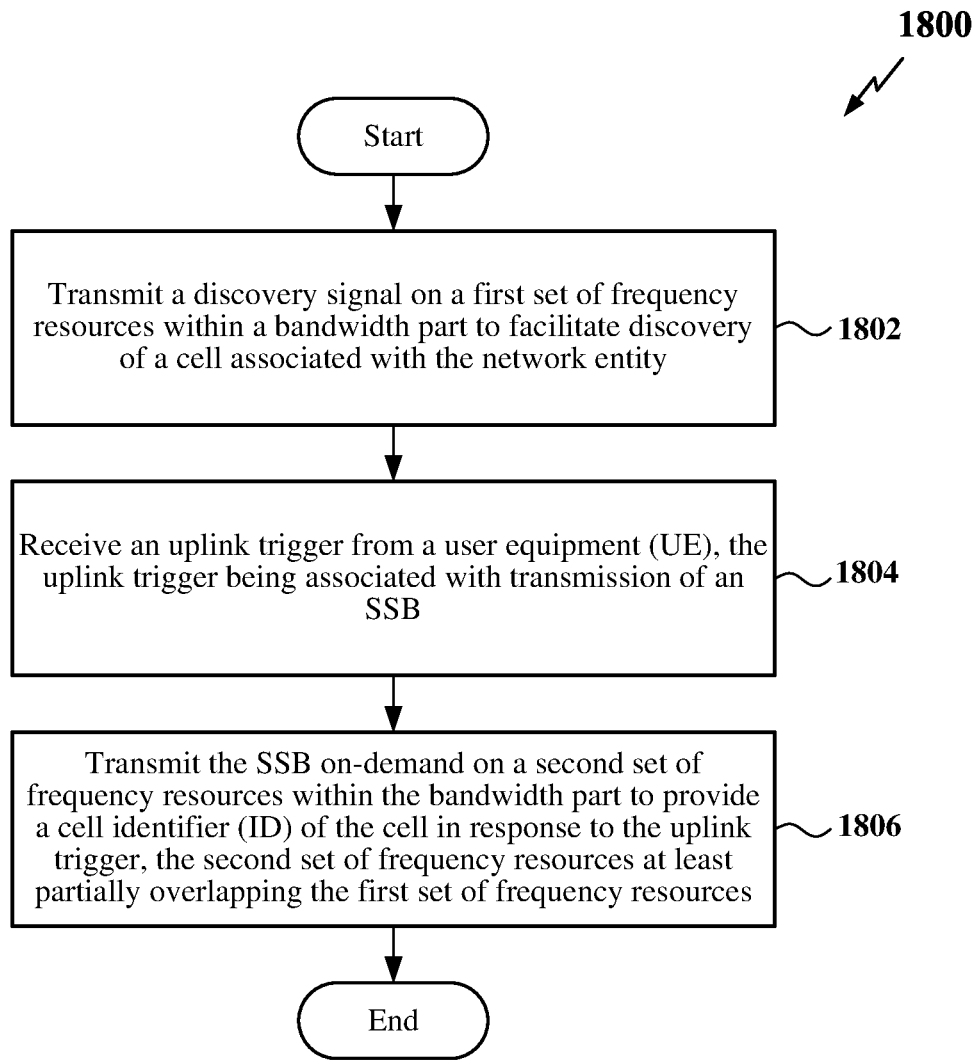
FIG. 18 is a flow chart illustrating another exemplary process for reduced SSB transmission according to some aspects

FIG. 18 is a flow chart illustrating another exemplary process 1800 for reduced SSB transmission according to some aspects. As described below, some or all illustrated features may be omitted in a particular implementation within the scope of the present disclosure, and some illustrated features may not be required for implementation of all embodiments. In some examples, the process 1800 may be carried out by the network entity 1500 illustrated in FIG. 15. In some examples, the process 1800 may be carried out by any suitable apparatus or means for carrying out the functions or algorithm described below.

At block 1802, the network entity may transmit a discovery signal on a first set of frequency resources within a bandwidth part to facilitate discovery of a cell associated with the network entity. In some examples, the network entity may transmit a plurality of discovery signal bursts within an SSB period. In this example, each of the plurality of discovery signal bursts includes a respective discovery signal burst index identifying the respective discovery signal burst within the SSB period. In other examples, each of the plurality of discovery signal bursts within the SSB period includes a burst offset to a next SSB burst. In some examples, the network entity may transmit a plurality of discovery signal bursts within an uplink trigger (ULT) period, each of the plurality of discovery signal bursts including a burst offset to a next ULT burst. For example, the communication and processing circuitry 1542, together with the discovery signal generation circuitry 1544 and communication interface 1510, shown and described above in connection with FIG. 15, may provide a means to transmit the discovery signal.

At block 1804, the network entity may receive an uplink trigger from a user equipment (UE), the uplink trigger being associated with transmission of an SSB. In some examples, the discovery signal includes an offset to the uplink trigger. For example, the communication and processing circuitry 1542, together with the discovery signal generation circuitry 1544 and communication interface 1510, shown and described above in connection with FIG. 15, may provide a means to receive the uplink trigger.

At block 1806, the network entity may transmit the SSB on-demand on a second set of frequency resources within the bandwidth part to provide a cell identifier (ID) of the cell in response to the uplink trigger, the second set of frequency resources at least partially overlapping the first set of frequency resources. In some examples, the uplink trigger is received on a third set of frequency resources within the bandwidth part, the third set of frequency resources at least partially overlapping the first set of frequency resources and the second set of frequency resources. In some examples, the SSB is transmitted on an off-raster frequency and the cell is a secondary serving cell for the UE. In some examples, the first set of frequency resources is identical to the second set of frequency resources. In some examples, the discovery signal includes a first primary synchronization signal (PSS) associated with a first PSS identifier (ID) and the SSB includes a second PSS associated with a second PSS ID different than the first PSS ID. In this example, the network entity may further provide a mapping between the first PSS ID and the second PSS ID. For example, the communication and processing circuitry 1542, together with the SSB management circuitry 1546 and communication interface 1510, shown and described above in connection with FIG. 15, may provide a means to transmit the SSB.

Figure 19:
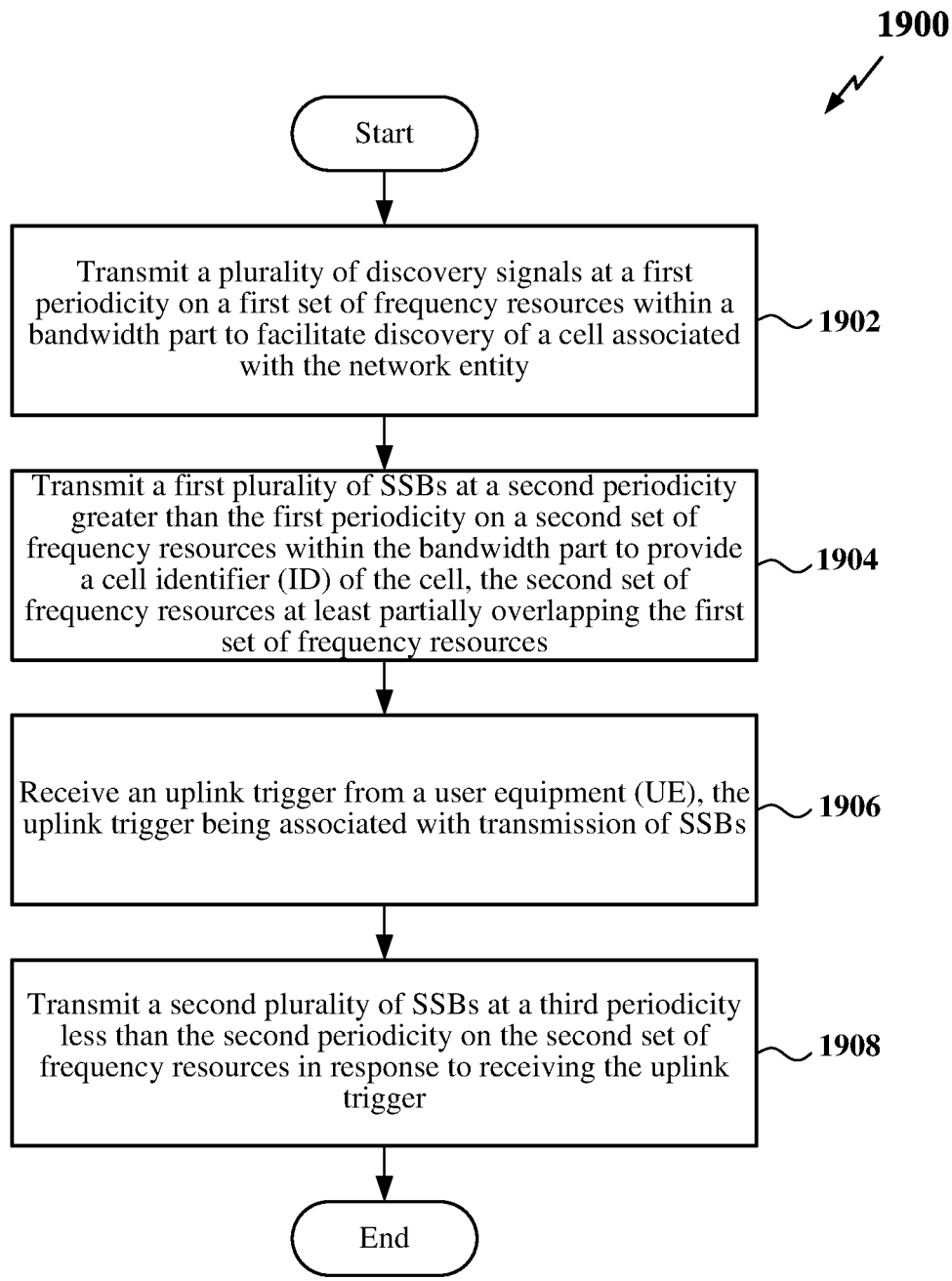
FIG. 19 is a flow chart illustrating another exemplary process for reduced SSB transmission according to some aspects

FIG. 19 is a flow chart illustrating another exemplary process 1900 for reduced SSB transmission according to some aspects. As described below, some or all illustrated features may be omitted in a particular implementation within the scope of the present disclosure, and some illustrated features may not be required for implementation of all embodiments. In some examples, the process 1900 may be carried out by the network entity 1500 illustrated in FIG. 15. In some examples, the process 1900 may be carried out by any suitable apparatus or means for carrying out the functions or algorithm described below.

At block 1902, the network entity may transmit a plurality of discovery signals at a first periodicity on a first set of frequency resources within a bandwidth part to facilitate discovery of a cell associated with the network entity. In some examples, the network entity may transmit a plurality of discovery signal bursts within an SSB period. In this example, each of the plurality of discovery signal bursts includes a respective discovery signal burst index identifying the respective discovery signal burst within the SSB period. In other examples, each of the plurality of discovery signal bursts within the SSB period includes a burst offset to a next SSB burst. In some examples, the network entity may transmit a plurality of discovery signal bursts within an uplink trigger (ULT) period, each of the plurality of discovery signal bursts including a burst offset to a next ULT burst. For example, the communication and processing circuitry 1542, together with the discovery signal generation circuitry 1544 and communication interface 1510, shown and described above in connection with FIG. 15, may provide a means to transmit the plurality of discovery signals.

At block 1904, the network entity may transmit a first plurality of SSBs at a second periodicity greater than the first periodicity on a second set of frequency resources within the bandwidth part to provide a cell identifier (ID) of the cell, the second set of frequency resources at least partially overlapping the first set of frequency resources. In some examples, the first set of frequency resources is identical to the second set of frequency resources. In some examples, each of the discovery signals includes a first primary synchronization signal (PSS) associated with a first PSS identifier (ID) and each of the SSBs includes a second PSS associated with a second PSS ID different than the first PSS ID. In this example, the network entity may further provide a mapping between the first PSS ID and the second PSS ID. For example, the communication and processing circuitry 1542, together with the SSB management circuitry 1546 and communication interface 1510, shown and described above in connection with FIG. 15, may provide a means to transmit the first plurality of SSBs.

At block 1906, the network entity may receive an uplink trigger from a user equipment (UE), the uplink trigger being associated with transmission of SSBs. In some examples, the uplink trigger is received on a third set of frequency resources within the bandwidth part, the third set of frequency resources at least partially overlapping the first set of frequency resources and the second set of frequency resources. In some examples, the discovery signal includes an offset to the uplink trigger. For example, the communication and processing circuitry 1542, together with the discovery signal generation circuitry 1544 and communication interface 1510, shown and described above in connection with FIG. 15, may provide a means to receive the uplink trigger.

At block 1908, the network entity may transmit a second plurality of SSBs at a third periodicity less than the second periodicity on the second set of frequency resources in response to receiving the uplink trigger. In some examples, the SSB is transmitted on an off-raster frequency and the cell is a secondary serving cell for the UE. In some examples, the network entity may transmit the second plurality of SSBs in a direction of the UE. For example, the communication and processing circuitry 1542, together with the SSB management circuitry 1546 and communication interface 1510, shown and described above in connection with FIG. 15, may provide a means to transmit the first plurality of SSBs.

In one configuration, the UE includes means for providing a discovery signal on a first set of frequency resources within a bandwidth part to facilitate discovery of a cell associated with the network entity and means for providing a synchronization signal block (SSB) on a second set of frequency resources within the bandwidth part to provide a cell identifier (ID) of the cell, the second set of frequency resources at least partially overlapping the first set of frequency resources. In one aspect, the aforementioned means may be the processor 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the computer-readable storage medium 1506, or any other suitable apparatus or means described in any one of the FIGS. 1, 2, 4, 12, and/or 15, and utilizing, for example, the processes and/or algorithms described herein in relation to FIGS. 13-14, and/or 16-19.

Figure 20:
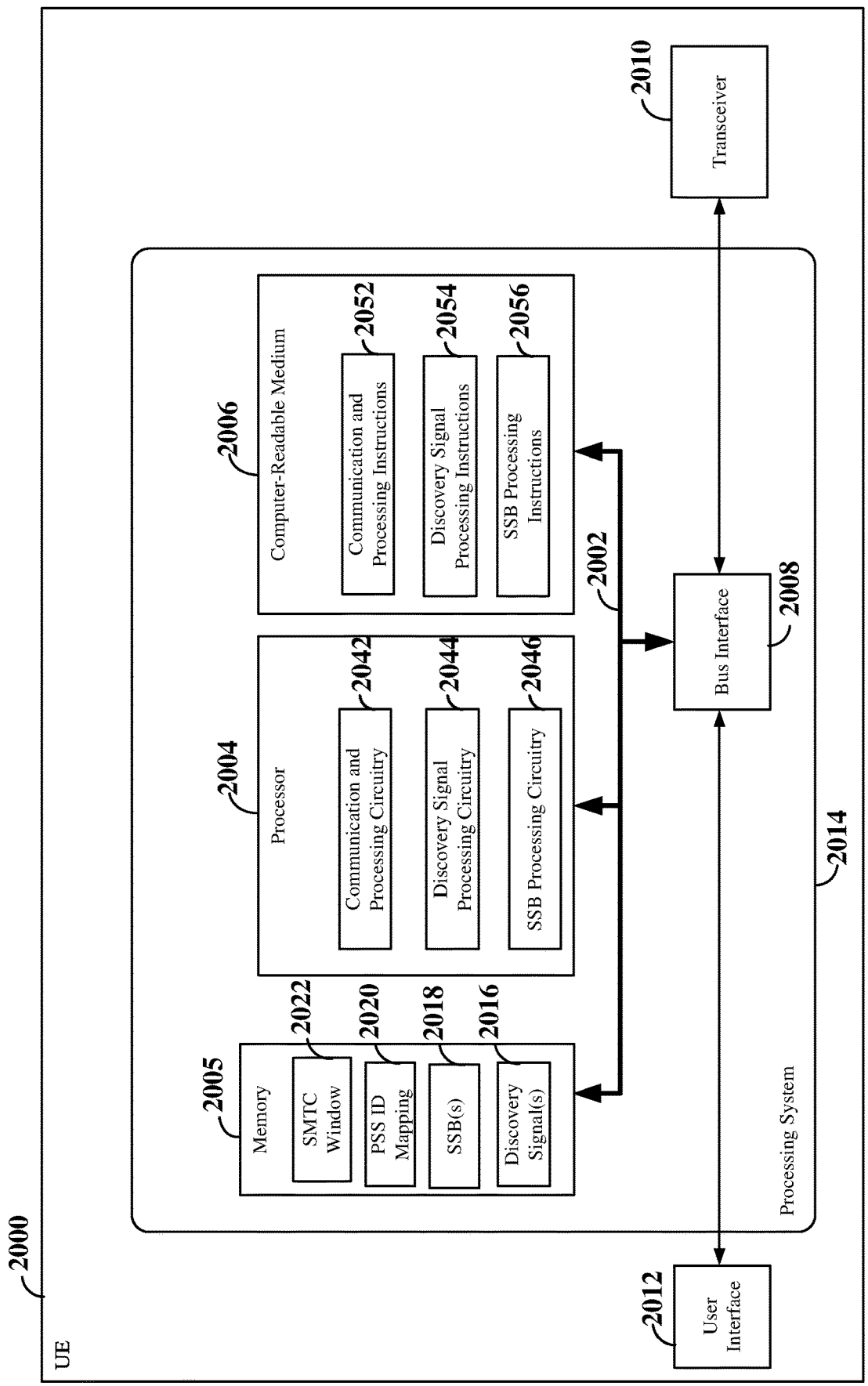
FIG. 20 is a block diagram illustrating an example of a hardware implementation for a user equipment (UE) employing a processing system according to some aspects.

FIG. 20 is a block diagram illustrating an example of a hardware implementation of a user equipment (UE) 2000 employing a processing system 2014 according to some aspects. The UE 2000 may be any of the UEs or other scheduled entities illustrated in any one or more of FIGS. 1, 2, 4, and/or 12.

In accordance with various aspects of the disclosure, an element, or any portion of an element, or any combination of elements may be implemented with a processing system 2014 that includes one or more processors, such as processor 2004. The processing system 2014 may be substantially the same as the processing system 1514 as shown and described above in connection with FIG. 15, including a bus interface 2008, a bus 2002, a memory 2005, a processor 2004, and a computer-readable medium 2006. Accordingly, their descriptions will not be repeated for the sake of brevity. Furthermore, the UE 2000 may include an optional user interface 2012 and a transceiver 2010.

The processor 2004, as utilized in the UE 2000, may be used to implement any one or more of the processes described below. In some examples, the memory 2005 may store discovery signal(s) 2016, SSB(s) 2018, a PSS ID mapping 2020, and/or an SMTC window 2022 for use by the processor 2004 when executing software (instructions) stored on the computer-readable medium 2006.

In some aspects of the disclosure, the processor 2004 may include communication and processing circuitry 2042 configured for various functions, including, for example, communicating with one or more UEs or other scheduled entities. In some examples (e.g., in an aggregated base station architecture), the communication and processing circuitry 2042 may include one or more hardware components that provide the physical structure that performs processes related to wireless communication (e.g., signal reception and/or signal transmission) and signal processing (e.g., processing a received signal and/or processing a signal for transmission). In addition, the communication and processing circuitry 2042 may be configured to process and transmit downlink traffic (e.g., packets) and downlink control and receive and process uplink traffic (e.g., packets) and uplink control.

The communication and processing circuitry 2042 may further be configured to receive (e.g., via the transceiver 2010) a discovery signal 2016 on a first set of frequency resources within a bandwidth part to facilitate discovery of a cell associated with a network entity. The communication and processing circuitry 2042 may further be configured to receive an SSB 2018 on a second set of frequency resources within the bandwidth part to provide a cell ID of the cell. The second set of frequency resources at least partially overlapping the first set of frequency resources. In some examples, the second set of frequency resources may be identical to the first set of frequency resources.

In some examples, the communication and processing circuitry 2042 may be configured to receive a plurality of discovery signal bursts 2016 within an SSB period. In some examples, the communication and processing circuitry 2042 may be configured to receive a plurality of discovery signals 2016 at a first periodicity and to receive a plurality of SSBs 2018 at a second periodicity greater than the first periodicity on an off-raster frequency.

In some examples, the discovery signal may include a first PSS associated with a first PSS ID and the SSB may include a second PSS associated with a second, different PSS ID. In this example, the communication and processing circuitry 2042 may be configured to receive a mapping 2020 between the first PSS ID and the second PSS ID. In other examples, the mapping 2020 may be pre-configured and stored in the memory 2005.

The communication and processing circuitry 2042 may further be configured to transmit an uplink trigger associated with transmission of the SSB to the network entity. In some examples, the uplink trigger is transmitted on a third set of frequency resources within the bandwidth part that at least partially overlaps the first set of frequency resources and the second set of frequency resources. In some examples, the communication and processing circuitry 2042 may be configured to receive the SSB 2018 on-demand in response to the uplink trigger. In some examples, the SSB 2018 is received on an off-raster frequency. In this example, the cell served by the network entity may be a secondary serving cell for the UE 2000.

The communication and processing circuitry 2042 may further be configured to receive a plurality of discovery signals 2016 at a first periodicity, receive a first plurality of SSBs 2018 at a second periodicity greater than the first periodicity, and receive a second plurality of SSBs 2018 at a third periodicity less than the second periodicity in response to transmitting the uplink trigger. For example, the communication and processing circuitry 2042 may further be configured to receive the second plurality of SSBs 2018 in a direction of the UE (e.g., via one or more directional beams of the network entity). In some examples, the communication and processing circuitry 2042 may be configured to receive a plurality of discovery signal bursts 2016 within an uplink trigger (ULT) period.

The communication and processing circuitry 2042 may further be configured to receive an SMTC window 2022 aligned to the second periodicity of SSBs from the network entity and to perform radio resource management (RRM) with the cell served by the network entity using the SMTC window 2022. The communication and processing circuitry 2042 may further be configured to execute communication and processing instructions (software) 2052 stored on the computer-readable medium 2006 to implement one or more of the functions described here.

The processor 2004 may further include discovery signal processing circuitry 2044, configured to process the discovery signal(s) 2016 received via the communication and processing circuitry 2042. The discovery signal processing circuitry 2044 may further be configured to receive the discovery signal 2016 on the first set of frequency resources. The discovery signal processing circuitry 2044 may further be configured to generate and transmit the uplink trigger in response to receiving the discovery signal 2016. The uplink trigger may correspond to a request for an on-demand SSB or a request to reduce the periodicity of SSB transmissions. In some examples, the discovery signal processing circuitry 2044 may be configured to operate together with the communication and processing circuitry 2042 to transmit the uplink trigger on a third set of frequency resources within the bandwidth part, the third set of frequency resources at least partially overlapping the first set of frequency resources and the second set of frequency resources.

The discovery signal processing circuitry 2044 may be configured to process each of a plurality of discovery signal bursts received within an SSB period to determine a respective discovery signal burst index of each of the discovery signal bursts. The discovery signal burst index identifies the respective discovery signal burst within the SSB period. In other examples, the discovery signal processing circuitry 2044 may be configured to determine a respective burst offset included in each of the discovery signal bursts. The burst offset may identify a next SSB burst.

The discovery signal processing circuitry 2044 may further be configured to identify the first PSS ID of the discovery signal and to receive and store the PSS ID mapping 2020 the first PSS ID to the second PSS ID of the SSB. In some examples, the discovery signal processing circuitry 2044 may process the discovery signal 2016 to determine an offset to the uplink trigger (e.g., the uplink trigger resource).

The discovery signal processing circuitry 2044 may further be configured to operate together with the communication and processing circuitry 2042 to receive a plurality of discovery signals 2016 at the first periodicity. The discovery signal processing circuitry 2044 may further be configured to operate together with the communication and processing circuitry 2042 to receive a plurality of discovery signal bursts within the ULT period. In this example, the discovery signal processing circuitry 2042 may be configured to determine a respective burst offset to a next ULT burst (e.g., ULT burst resource) within each of the plurality of discovery signal bursts. The discovery signal processing circuitry 2044 may then be configured to transmit an ULT burst within the next ULT burst resource. The discovery signal processing circuitry 2044 may further be configured to execute discovery signal processing instructions (software) 2054 stored on the computer-readable medium 2006 to implement one or more functions described herein.

The processor 2004 may further include SSB processing circuitry 2046, configured to process SSBs received from a cell served by a network entity. The SSB processing circuitry 2046 may further be configured to receive the SSB on the second set of frequency resources within the bandwidth part. In some examples, the SSB processing circuitry 2046 may further be configured to process the SSB with the second PSS associated with the second PSS ID. For example, the SSB processing circuitry 2046 may operate together with the discovery signal processing circuitry 2044 to determine the second PSS ID based on the first PSS ID of the discovery signal 2016 and the mapping 2020. The SSB processing circuitry 2046 may further be configured to operate together with the communication and processing circuitry 2042 to transmit the plurality of SSBs at the second periodicity on an off-raster frequency.

The SSB processing circuitry 2046 may further be configured to receive an on-demand SSB in response to transmission by the discovery signal processing circuitry 2044 and the communication and processing circuitry 2042 of the uplink trigger. In this example, the on-demand SSB may be received on an off-raster frequency and the cell may be a secondary serving cell for the UE 2000.

The SSB processing circuitry 2046 may further be configured to receive reduced periodicity SSBs reduced from the second periodicity to the third periodicity in response to transmitting the uplink trigger. In addition, the SSB processing circuitry 2046 may be configured to operate together with the communication and processing circuitry 2042 to receive the second plurality of SSBs at the third periodicity transmitted in a direction of the UE (e.g., via directional beams of the network entity). The SSB processing circuitry 2046 may further be configured to execute SSB management instructions (software) 2056 stored on the computer-readable medium 2006 to implement one or more functions described herein.

Figure 21:
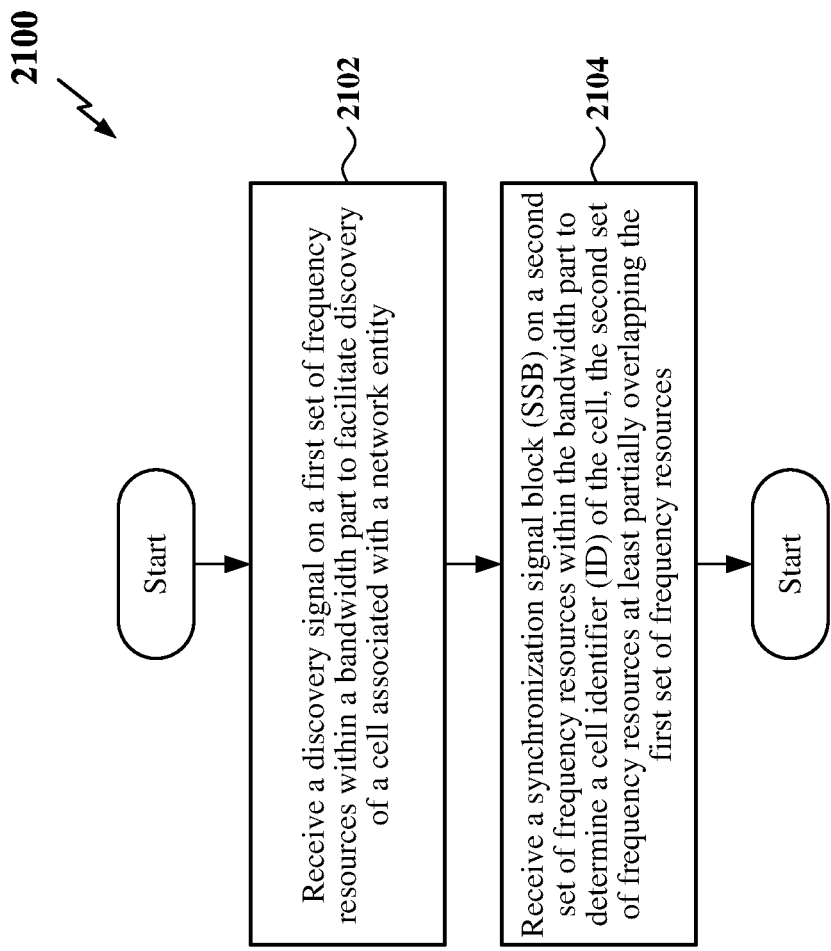
FIG. 21 is a flow chart of an exemplary process for reduced SSB reception according to some aspects.

FIG. 21 is a flow chart illustrating an exemplary process 2100 for reduced SSB reception according to some aspects. As described below, some or all illustrated features may be omitted in a particular implementation within the scope of the present disclosure, and some illustrated features may not be required for implementation of all embodiments. In some examples, the process 2100 may be carried out by the UE 2000 illustrated in FIG. 20. In some examples, the process 2100 may be carried out by any suitable apparatus or means for carrying out the functions or algorithm described below.

At block 2102, the UE may receive a discovery signal on a first set of frequency resources within a bandwidth part to facilitate discovery of a cell associated with a network entity. In some examples, the UE may receive a plurality of discovery signal bursts within an SSB period. Each of the plurality of discovery signal bursts can include either a respective discovery signal burst index identifying the respective discovery signal burst within the SSB period or a burst offset to a next SSB burst. For example, the communication and processing circuitry 2042, together with the discovery signal processing circuitry 2044 and transceiver 2010, shown and described above in connection with FIG. 20 may provide a means to receive the discovery signal.

At block 2104, the UE may receive a synchronization signal block (SSB) on a second set of frequency resources within the bandwidth part to determine a cell identifier (ID) of the cell, the second set of frequency resources at least partially overlapping the first set of frequency resources. In some examples, the discovery signal includes a first primary synchronization signal (PSS) associated with a first PSS identifier (ID) and the SSB includes a second PSS associated with a second PSS ID different than the first PSS ID. In this example, the UE may receive a mapping between the first PSS ID and the second PSS ID. For example, the communication and processing circuitry 2042, together with the discovery signal processing circuitry 2044, the SSB processing circuitry 2046, and transceiver 2010, shown and described above in connection with FIG. 20 may provide a means to receive the SSB.

Figure 22:
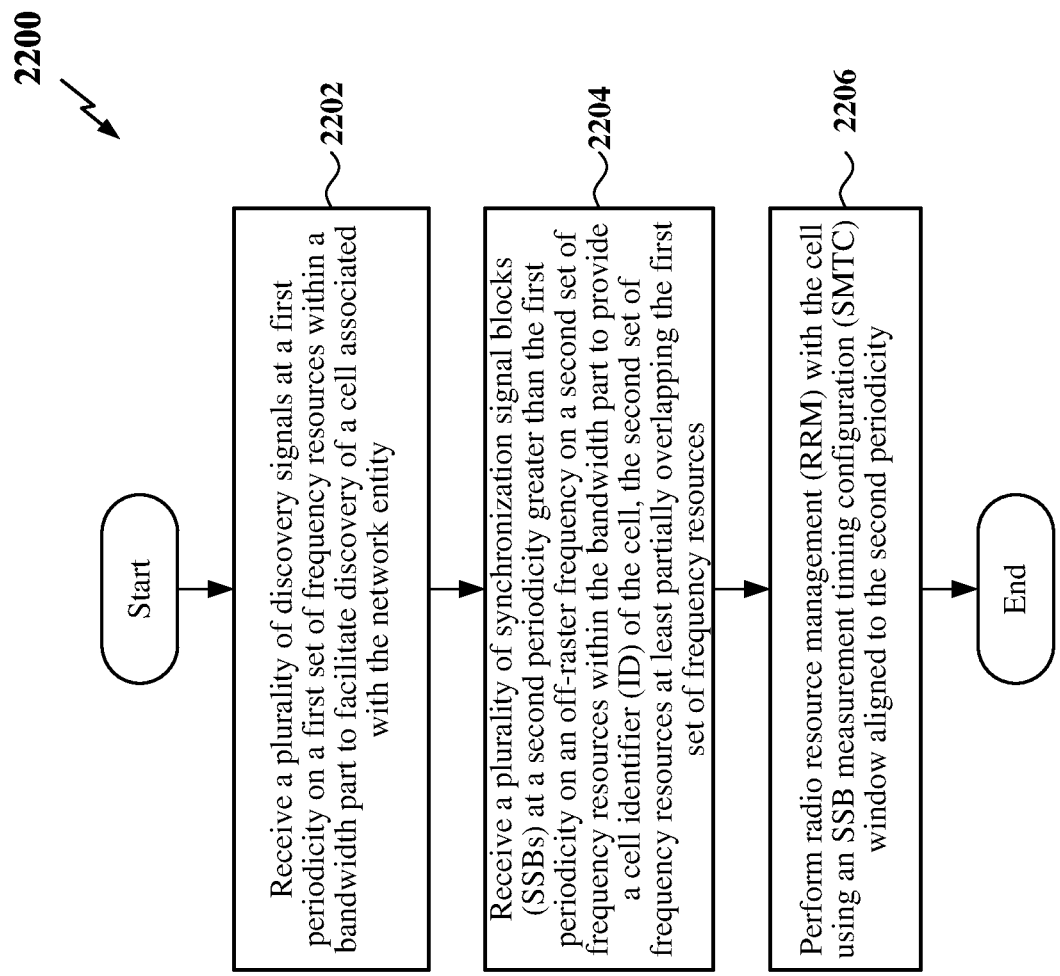
FIG. 22 is a flow chart of another exemplary process for reduced SSB reception according to some aspects.

FIG. 22 is a flow chart illustrating another exemplary process 2200 for reduced SSB reception according to some aspects. As described below, some or all illustrated features may be omitted in a particular implementation within the scope of the present disclosure, and some illustrated features may not be required for implementation of all embodiments. In some examples, the process 2200 may be carried out by the UE 2000 illustrated in FIG. 20. In some examples, the process 2200 may be carried out by any suitable apparatus or means for carrying out the functions or algorithm described below.

At block 2202, the UE may receive a plurality of discovery signals at a first periodicity on a first set of frequency resources within a bandwidth part to facilitate discovery of a cell associated with a network entity. In some examples, the UE may receive a plurality of discovery signal bursts within an SSB period. Each of the plurality of discovery signal bursts can include either a respective discovery signal burst index identifying the respective discovery signal burst within the SSB period or a burst offset to a next SSB burst. For example, the communication and processing circuitry 2042, together with the discovery signal processing circuitry 2044 and transceiver 2010, shown and described above in connection with FIG. 20 may provide a means to receive the plurality of discovery signals.

At block 2204, the UE may receive a plurality of synchronization signal blocks (SSBs) at a second periodicity greater than the first periodicity on a second set of frequency resources within the bandwidth part to determine a cell identifier (ID) of the cell, the second set of frequency resources at least partially overlapping the first set of frequency resources. In some examples, each of the discovery signals includes a first primary synchronization signal (PSS) associated with a first PSS identifier (ID) and each of the SSBs includes a second PSS associated with a second PSS ID different than the first PSS ID. In this example, the UE may receive a mapping between the first PSS ID and the second PSS ID. For example, the communication and processing circuitry 2042, together with the discovery signal processing circuitry 2044, the SSB processing circuitry 2046, and transceiver 2010, shown and described above in connection with FIG. 20 may provide a means to receive the plurality of SSBs.

At block 2206, the UE may perform radio resource management (RRM) with the cell using an SSB measurement timing configuration (SMTC) window aligned to the second periodicity. In some examples, the UE may receive the SMTC window from the network entity. For example, the communication and processing circuitry 2042 and transceiver 2010 shown and described above in connection with FIG. 20 may provide a means to perform RRM.

Figure 23:
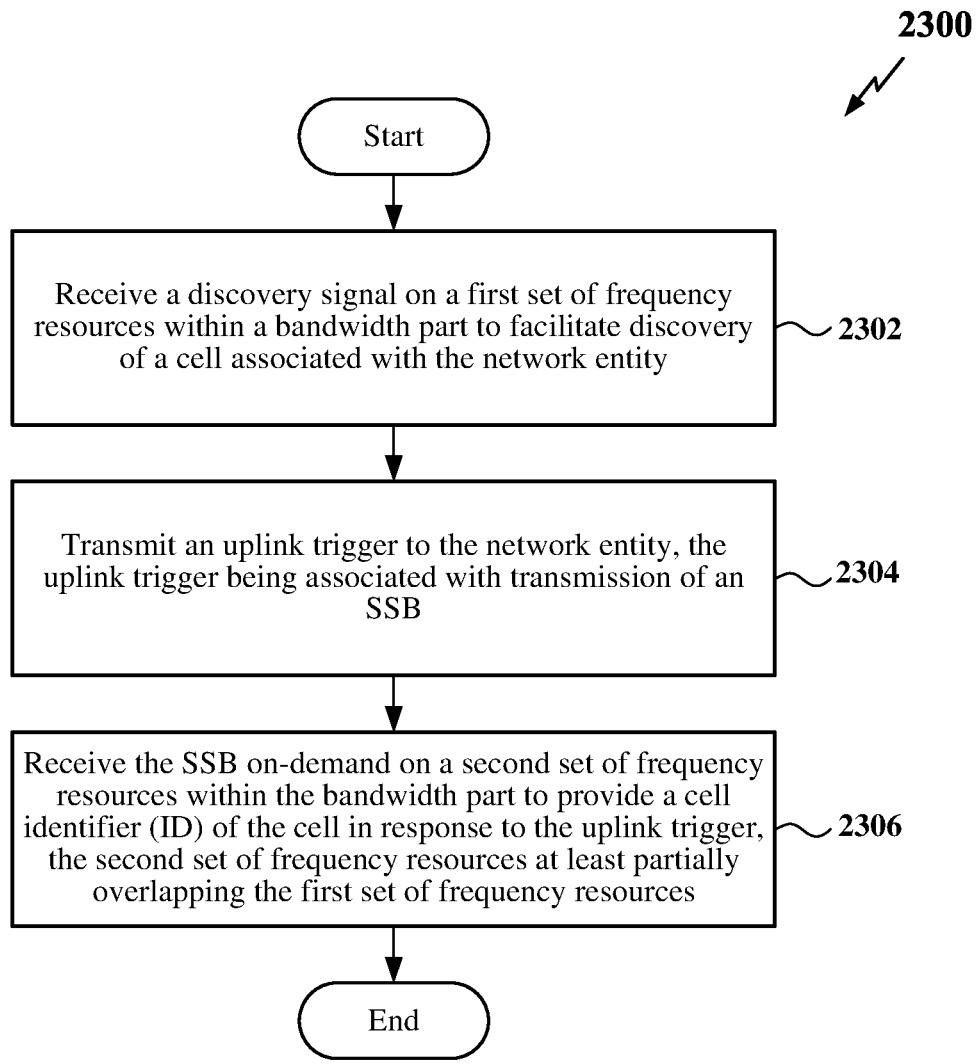
FIG. 23 is a flow chart of another exemplary process for reduced SSB reception according to some aspects.

FIG. 23 is a flow chart illustrating another exemplary process 2300 for reduced SSB reception according to some aspects. As described below, some or all illustrated features may be omitted in a particular implementation within the scope of the present disclosure, and some illustrated features may not be required for implementation of all embodiments. In some examples, the process 2300 may be carried out by the UE 2000 illustrated in FIG. 20. In some examples, the process 2300 may be carried out by any suitable apparatus or means for carrying out the functions or algorithm described below.

At block 2302, the UE may receive a discovery signal on a first set of frequency resources within a bandwidth part to facilitate discovery of a cell associated with a network entity. In some examples, the UE may receive a plurality of discovery signal bursts within an SSB period. Each of the plurality of discovery signal bursts can include either a respective discovery signal burst index identifying the respective discovery signal burst within the SSB period or a burst offset to a next SSB burst. For example, the communication and processing circuitry 2042, together with the discovery signal processing circuitry 2044 and transceiver 2010, shown and described above in connection with FIG. 20 may provide a means to receive the discovery signal.

At block 2304, the UE may transmit an uplink trigger associated with transmission of an SSB. In some examples, the discovery signal may include an offset to the uplink trigger (e.g., uplink trigger resource). In some examples, the UE may receive a plurality of discovery signal bursts within an uplink trigger (ULT) period. In this example, each of the discovery signal bursts may include a burst offset to a next ULT burst (e.g., ULT burst resource). For example, the communication and processing circuitry 2042, together with the discovery signal processing circuitry 2044 and transceiver 2010, shown and described above in connection with FIG. 20 may provide a means to transmit the uplink trigger.

At block 2306, the UE may receive a synchronization signal block (SSB) on a second set of frequency resources within the bandwidth part to determine a cell identifier (ID) of the cell, the second set of frequency resources at least partially overlapping the first set of frequency resources. In some examples, the uplink trigger may be transmitted on a third set of frequency resources within the bandwidth part, the third set of frequency resources at least partially overlapping the first set of frequency resources and the second set of frequency resources.

In some examples, the discovery signal includes a first primary synchronization signal (PSS) associated with a first PSS identifier (ID) and the SSB includes a second PSS associated with a second PSS ID different than the first PSS ID. In this example, the UE may receive a mapping between the first PSS ID and the second PSS ID. For example, the communication and processing circuitry 2042, together with the discovery signal processing circuitry 2044, the SSB processing circuitry 2046, and transceiver 2010, shown and described above in connection with FIG. 20 may provide a means to receive the SSB.

Figure 24:
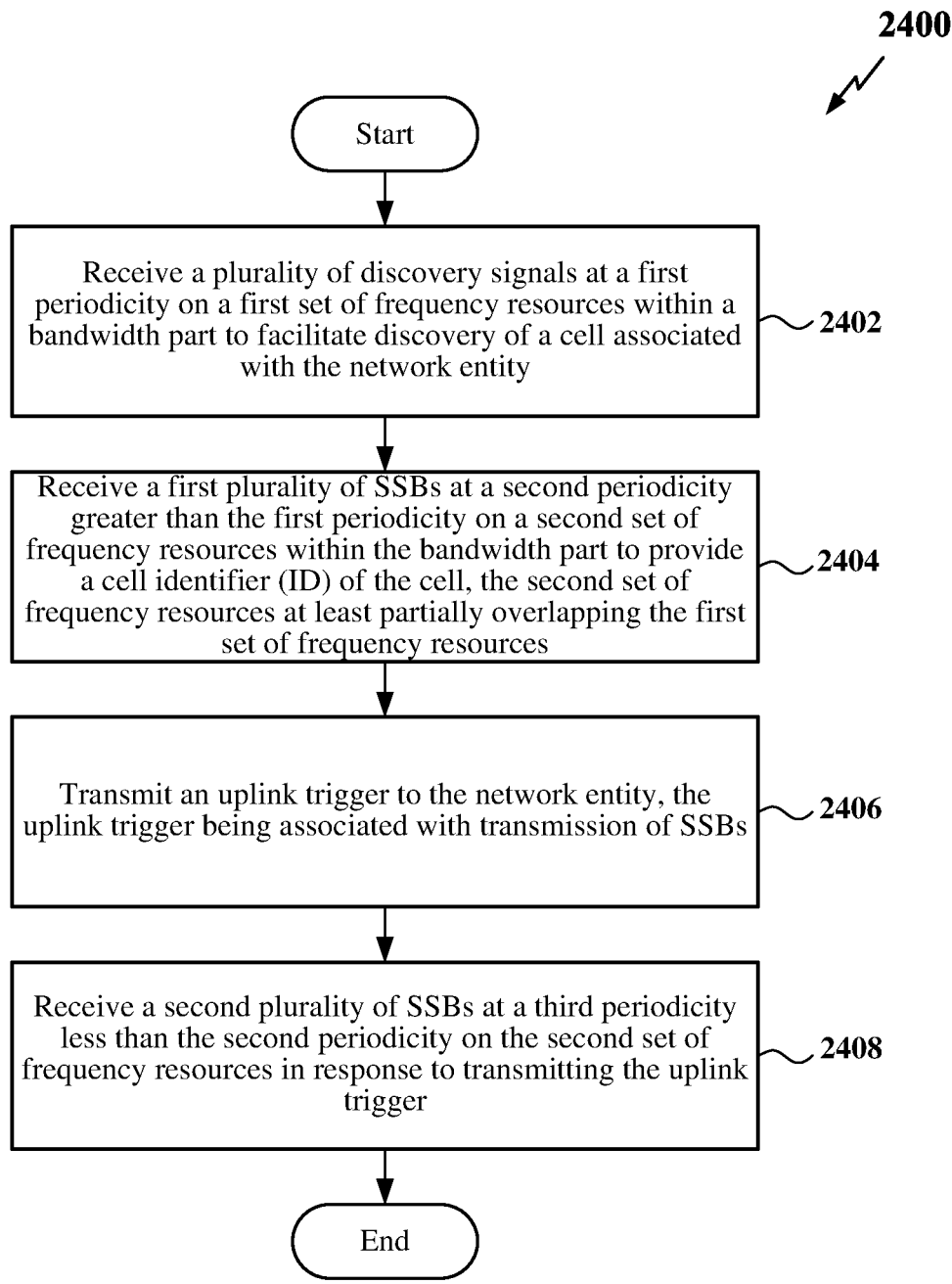
FIG. 24 is a flow chart of another exemplary process for reduced SSB reception according to some aspects.

FIG. 24 is a flow chart illustrating another exemplary process 2400 for reduced SSB reception according to some aspects. As described below, some or all illustrated features may be omitted in a particular implementation within the scope of the present disclosure, and some illustrated features may not be required for implementation of all embodiments. In some examples, the process 2400 may be carried out by the UE 2000 illustrated in FIG. 20. In some examples, the process 2400 may be carried out by any suitable apparatus or means for carrying out the functions or algorithm described below.

At block 2402, the UE may receive a plurality of discovery signals at a first periodicity on a first set of frequency resources within a bandwidth part to facilitate discovery of a cell associated with a network entity. In some examples, the UE may receive a plurality of discovery signal bursts within an SSB period. Each of the plurality of discovery signal bursts can include either a respective discovery signal burst index identifying the respective discovery signal burst within the SSB period or a burst offset to a next SSB burst. For example, the communication and processing circuitry 2042, together with the discovery signal processing circuitry 2044 and transceiver 2010, shown and described above in connection with FIG. 20 may provide a means to receive the plurality of discovery signals.

At block 2404, the UE may receive a first plurality of SSBs at a second periodicity greater than the first periodicity on a second set of frequency resources within the bandwidth part to provide a cell identifier (ID) of the cell, the second set of frequency resources at least partially overlapping the first set of frequency resources. In some examples, the discovery signal includes a first primary synchronization signal (PSS) associated with a first PSS identifier (ID) and the SSB includes a second PSS associated with a second PSS ID different than the first PSS ID. In this example, the UE may receive a mapping between the first PSS ID and the second PSS ID. For example, the communication and processing circuitry 2042, together with the discovery signal processing circuitry 2044, SSB processing circuitry 2046, and transceiver 2010, shown and described above in connection with FIG. 20 may provide a means to receive the first plurality of SSBs.

At block 2406, the UE may transmit an uplink trigger associated with transmission of an SSB. In some examples, the discovery signals may each include a respective offset to the next uplink trigger resource. In some examples, the UE may receive a plurality of discovery signal bursts within an uplink trigger (ULT) period. In this example, each of the discovery signal bursts may include a burst offset to a next ULT burst (e.g., ULT burst resource). For example, the communication and processing circuitry 2042, together with the discovery signal processing circuitry 2044 and transceiver 2010, shown and described above in connection with FIG. 20 may provide a means to transmit the uplink trigger.

At block 2308, the UE may receive a second plurality of SSBs at a third periodicity less than the second periodicity on the second set of frequency resources in response to transmitting the uplink trigger. In some examples, the uplink trigger may be transmitted on a third set of frequency resources within the bandwidth part, the third set of frequency resources at least partially overlapping the first set of frequency resources and the second set of frequency resources. For example, the communication and processing circuitry 2042, together with the discovery signal processing circuitry 2044, the SSB processing circuitry 2046, and transceiver 2010, shown and described above in connection with FIG. 20 may provide a means to receive the second plurality of SSBs.

In one configuration, the UE includes means for receiving a discovery signal on a first set of frequency resources within a bandwidth part to facilitate discovery of a cell associated with a network entity and means for receiving a synchronization signal block (SSB) on a second set of frequency resources within the bandwidth part to determine a cell identifier (ID) of the cell, the second set of frequency resources at least partially overlapping the first set of frequency resources. In one aspect, the aforementioned means may be the processor 2004 shown in FIG. 20 configured to perform the functions recited by the aforementioned means. In another aspect, the aforementioned means may be a circuit or any apparatus configured to perform the functions recited by the aforementioned means.

Of course, in the above examples, the circuitry included in the processor 2004 is merely provided as an example, and other means for carrying out the described functions may be included within various aspects of the present disclosure, including but not limited to the instructions stored in the computer-readable storage medium 2006, or any other suitable apparatus or means described in any one of the FIGS.

1, 2, 4, 12, and/or 20, and utilizing, for example, the processes and/or algorithms described herein in relation to FIGS. 21-24.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB (gNB), access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In some examples, the network entity 2800 shown and described above in connection with FIG. 15 may be a disaggregated base station. For example, the network entity 1500 shown in FIG. 15 may include the CU and optionally one or more DUs/RUs of the disaggregated base station. Other DUs/RUs associated with the network entity 1500 may be distributed throughout the network. In some examples, the DUs/RUs may correspond to TRPs associated with the network entity. In some examples, the CU and/or DU/RU of the disaggregated base station (e.g., within the network entity 1500) may provide a discovery signal on a first set of frequency resources within a bandwidth part to facilitate discovery of a cell associated with the network entity and provide an SSB on a second set of frequency resources that at least partially overlaps the first set of frequency resources within the bandwidth part to provide a cell ID of the cell.

Figure 25:
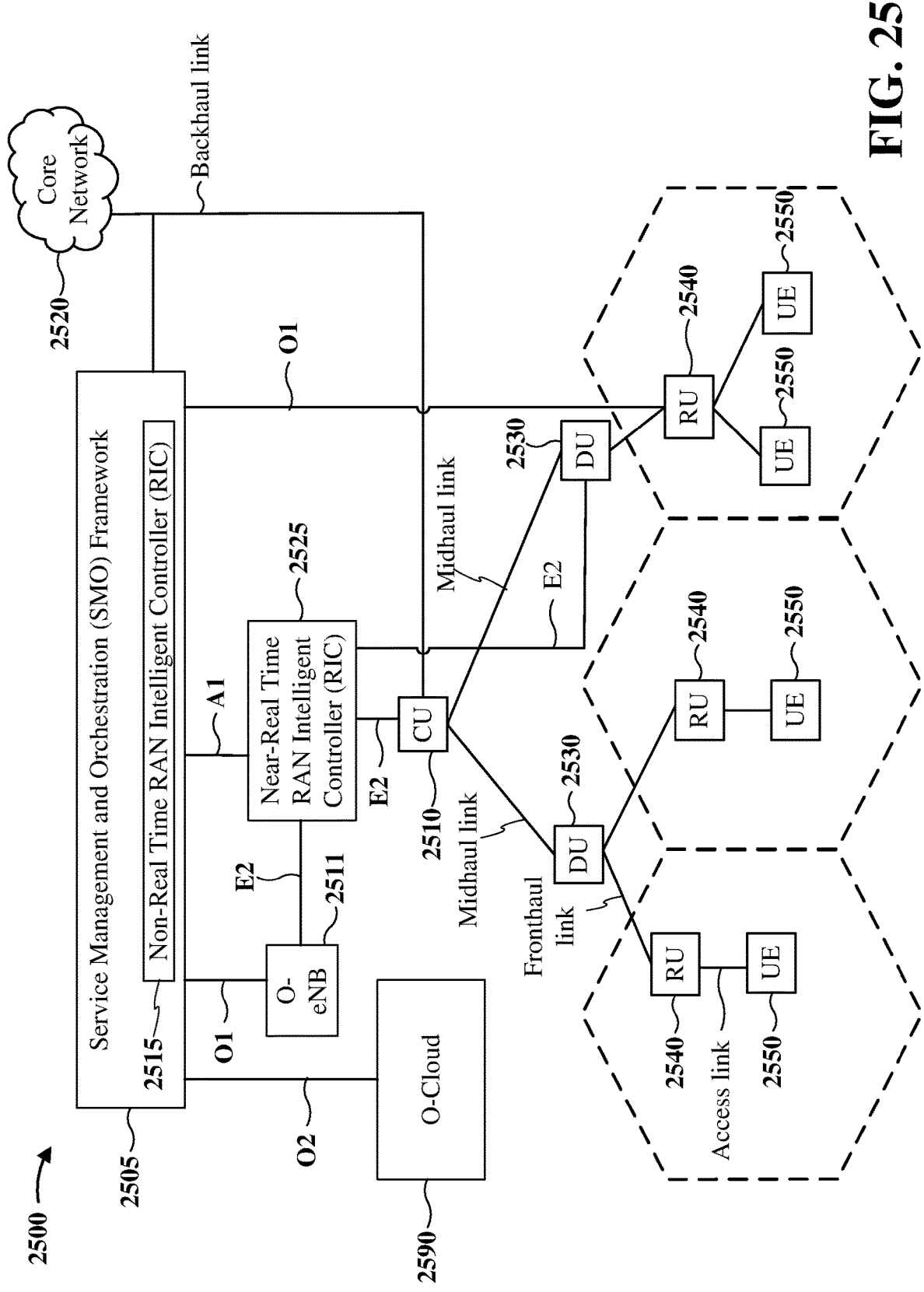
FIG. 25 is a diagram providing a high-level illustration of one example of a configuration of a disaggregated base station according to some aspects.

FIG. 25 shows a diagram illustrating an example disaggregated base station 2500 architecture. The disaggregated base station 2500 architecture may include one or more central units (CUs) 2510 that can communicate directly with a core network 2520 via a backhaul link, or indirectly with the core network 2520 through one or more disaggregated base station units (such as a Near-Real Time (Near-RT) RAN Intelligent Controller (RIC) 2525 via an E2 link, or a Non-Real Time (Non-RT) RIC 2515 associated with a Service Management and Orchestration (SMO) Framework 2505, or both). A CU 2510 may communicate with one or more distributed units (DUs) 2530 via respective midhaul links, such as an F1 interface. The DUs 2530 may communicate with one or more radio units (RUs) 2540 via respective fronthaul links. The RUs 2540 may communicate with respective UEs 2550 via one or more radio frequency (RF) access links. In some implementations, the UE 2550 may be simultaneously served by multiple RUs 2540.

Each of the units, i.e., the CUs 2510, the DUs 2530, the RUs 2540, as well as the Near-RT RICs 2525, the Non-RT RICs 2515 and the SMO Framework 2505, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 2510 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 2510. The CU 2510 may be configured to handle user plane functionality (i.e., Central Unit-User Plane (CU-UP)), control plane functionality (i.e., Central Unit-Control Plane (CU-CP)), or a combination thereof. In some implementations, the CU 2510 can be logically split into one or more CU-UP units and one or more CU-CP units. The CU-UP unit can communicate bidirectionally with the CU-CP unit via an interface, such as the E1 interface when implemented in an O-RAN configuration. The CU 2510 can be implemented to communicate with the DU 2530, as necessary, for network control and signaling.

The DU 2530 may correspond to a logical unit that includes one or more base station functions to control the operation of one or more RUs 2540. In some aspects, the DU 2530 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 2530 may further host one or more low PHY layers. Each layer (or module) can be implemented with an interface configured to communicate signals with other layers (and modules) hosted by the DU 2530, or with the control functions hosted by the CU 2510.

Lower-layer functionality can be implemented by one or more RUs 2540. In some deployments, an RU 2540, controlled by a DU 2530, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 2540 can be implemented to handle over the air (OTA) communication with one or more UEs 2550. In some implementations, real-time and non-real-time aspects of control and user plane communication with the RU(s) 2540 can be controlled by the corresponding DU 2530. In some scenarios, this configuration can enable the DU(s) 2530 and the CU 2510 to be implemented in a cloud-based RAN architecture, such as a vRAN architecture.

The SMO Framework 2505 may be configured to support RAN deployment and provisioning of non-virtualized and virtualized network elements. For non-virtualized network elements, the SMO Framework 2505 may be configured to support the deployment of dedicated physical resources for RAN coverage requirements which may be managed via an operations and maintenance interface (such as an O1 interface). For virtualized network elements, the SMO Framework 2505 may be configured to interact with a cloud computing platform (such as an open cloud (O-Cloud) 2590) to perform network element life cycle management (such as to instantiate virtualized network elements) via a cloud computing platform interface (such as an O2 interface). Such virtualized network elements can include, but are not limited to, CUs 2510, DUs 2530, RUs 2540 and Near-RT RICs 2525. In some implementations, the SMO Framework 2505 can communicate with a hardware aspect of a 4G RAN, such as an open eNB (O-eNB) 2511, via an O1 interface. Additionally, in some implementations, the SMO Framework 2505 can communicate directly with one or more RUs 2540 via an O1 interface. The SMO Framework 2505 also may include a Non-RT RIC 2515 configured to support functionality of the SMO Framework 2505.

The Non-RT RIC 2515 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 2525. The Non-RT RIC 2515 may be coupled to or communicate with (such as via an A1 interface) the Near-RT RIC 2525. The Near-RT RIC 2525 may be configured to include a logical function that enables near-real-time control and optimization of RAN elements and resources via data collection and actions over an interface (such as via an E2 interface) connecting one or more CUs 2510, one or more DUs 2530, or both, as well as an O-eNB, with the Near-RT RIC 2525.

In some implementations, to generate AI/ML models to be deployed in the Near-RT RIC 2525, the Non-RT RIC 2515 may receive parameters or external enrichment information from external servers. Such information may be utilized by the Near-RT RIC 2525 and may be received at the SMO Framework 2505 or the Non-RT RIC 2515 from non-network data sources or from network functions. In some examples, the Non-RT RIC 2515 or the Near-RT RIC 2525 may be configured to tune RAN behavior or performance. For example, the Non-RT RIC 2515 may monitor long-term trends and patterns for performance and employ AI/ML models to perform corrective actions through the SMO Framework 2505 (such as reconfiguration via O1) or via creation of RAN management policies (such as A1 policies).

The following provides an overview of aspects of the present disclosure:

Aspect 1: A method for wireless communication at a network entity, the method comprising: providing a discovery signal on a first set of frequency resources within a bandwidth part to facilitate discovery of a cell associated with the network entity; and providing a synchronization signal block (SSB) on a second set of frequency resources within the bandwidth part to provide a cell identifier (ID) of the cell, the second set of frequency resources at least partially overlapping the first set of frequency resources.

Aspect 2: The method of aspect 1, wherein the first set of frequency resources is identical to the second set of frequency resources.

Aspect 3: The method of aspect 1 or 2, wherein the providing the discovery signal further comprises: transmitting a plurality of discovery signal bursts within an SSB period.

Aspect 4: The method of aspect 3, wherein each of the plurality of discovery signal bursts comprises a respective discovery signal burst index identifying the respective discovery signal burst within the SSB period.

Aspect 5: The method of aspect 3, wherein each of the plurality of discovery signal bursts within the SSB period comprises a burst offset to a next SSB burst.

Aspect 6: The method of any of aspects 1 through 5, wherein the discovery signal comprises a first primary synchronization signal (PSS) associated with a first PSS identifier (ID) and the SSB comprises a second PSS associated with a second PSS ID different than the first PSS ID.

Aspect 7: The method of aspect 6, further comprising: providing a mapping between the first PSS ID and the second PSS ID.

Aspect 8: The method of any of aspects 1 through 7, wherein the providing the discovery signal further comprises: transmitting a plurality of discovery signals at a first periodicity, and wherein the providing the SSB further comprises: transmitting a plurality of SSBs at a second periodicity greater than the first periodicity on an off-raster frequency to enable radio resource management (RRM) for a user equipment (UE) within an SSB measurement timing configuration (SMTC) window aligned to the second periodicity.

Aspect 9: The method of any of aspects 1 through 8, further comprising: receiving an uplink trigger from a user equipment (UE), the uplink trigger being associated with transmission of the SSB.

Aspect 10: The method of aspect 9, wherein the uplink trigger is received on a third set of frequency resources within the bandwidth part, the third set of frequency resources at least partially overlapping the first set of frequency resources and the second set of frequency resources.

Aspect 11: The method of aspect 9 or 10, wherein the providing the SSB further comprises: transmitting the SSB on-demand in response to the uplink trigger.

Aspect 12: The method of aspect 11, wherein the SSB is transmitted on an off-raster frequency and the cell is a secondary serving cell for the UE.

Aspect 13: The method of aspect 9 or 10, wherein the providing the discovery signal further comprises: transmitting a plurality of discovery signals at a first periodicity, and wherein the providing the SSB further comprises: transmitting a first plurality of SSBs at a second periodicity greater than the first periodicity; and transmitting a second plurality of SSBs at a third periodicity less than the second periodicity in response to receiving the uplink trigger.

Aspect 14: The method of aspect 13, wherein the transmitting the second plurality of SSBs further comprises: transmitting the second plurality of SSBs in a direction of the UE.

Aspect 15: The method of any of aspects 9 through 14, wherein the transmitting the plurality of discovery signals further comprises: transmitting a plurality of discovery signal bursts within an uplink trigger (ULT) period, each of the plurality of discovery signal bursts comprising a burst offset to a next ULT burst.

Aspect 16: The method of any of aspects 9 through 14, wherein the discovery signal comprises an offset to the uplink trigger (ULT).

Aspect 17: The method of any of aspects 9 through 16, wherein the providing the SSB further comprises: transmitting the SSB in response to a measurement of the uplink trigger being greater than or equal to a threshold.

Aspect 18: The method of aspect 17, wherein the providing the SSB further comprises: delaying transmission of the SSB in response to the measurement of the uplink trigger being less than the threshold.

Aspect 19: The method of aspect 18, wherein the delaying transmission of the SSB further comprises: delaying transmission of the SSB by a delay amount based on a mapping between the measurement and the delay amount.

Aspect 20: The method of any of aspects 17 through 19, further comprising: communicating with at least one additional network entity to indicate a response to the uplink trigger based on the measurement.

Aspect 21: The method of aspect 20, wherein the communicating with the at least one additional network entity further comprises: transmitting a signal carrying the indication of the response and one or more parameters related to the response to the at least one additional network entity.

Aspect 22: A network entity comprising a memory and a processor coupled to the memory, the processor configured to perform a method of any one of aspects 1 through 21.

Aspect 23: A network entity comprising means for performing a method of any one of aspects 1 through 21.

Aspect 24: An article of manufacture comprising a non-transitory computer-readable medium having stored therein instructions executable by one or more processors of a network entity to perform a method of any one of aspects 1 through 21.

Aspect 25: A method for wireless communication at a user equipment (UE), the method comprising: receiving a discovery signal on a first set of frequency resources within a bandwidth part to facilitate discovery of a cell associated with a network entity; and receiving a synchronization signal block (SSB) on a second set of frequency resources within the bandwidth part to determine a cell identifier (ID) of the cell, the second set of frequency resources at least partially overlapping the first set of frequency resources.

Aspect 26: The method of aspect 25, wherein the receiving the discovery signal further comprises: receiving a plurality of discovery signal bursts within an SSB period, each of the plurality of discovery signal bursts comprising either a respective discovery signal burst index identifying the respective discovery signal burst within the SSB period or a burst offset to a next SSB burst.

Aspect 27: The method of aspect 25 or 26, wherein the discovery signal comprises a first primary synchronization signal (PSS) associated with a first PSS identifier (ID) and the SSB comprises a second PSS associated with a second PSS ID different than the first PSS ID, and further comprising: receiving a mapping between the first PSS ID and the second PSS ID.

Aspect 28: The method of any of aspects 25 through 27, wherein the receiving the discovery signal further comprises: receiving a plurality of discovery signals at a first periodicity, and wherein the receiving the SSB further comprises: receiving a plurality of SSBs at a second periodicity greater than the first periodicity on an off-raster frequency, and further comprising: performing radio resource management (RRM) with the cell using an SSB measurement timing configuration (SMTC) window aligned to the second periodicity.

Aspect 29: The method of any of aspects 25 through 28, further comprising: transmitting an uplink trigger, the uplink trigger being associated with transmission of the SSB and being transmitted on a third set of frequency resources within the bandwidth part, the third set of frequency resources at least partially overlapping the first set of frequency resources and the second set of frequency resources.

Aspect 30: The method of aspect 29, wherein the receiving the SSB further comprises: receiving the SSB on-demand in response to the uplink trigger.

Aspect 31: The method of aspect 29, wherein the receiving the discovery signal further comprises: receiving a plurality of discovery signals at a first periodicity, and wherein the receiving the SSB further comprises: receiving a first plurality of SSBs at a second periodicity greater than the first periodicity; and receiving a second plurality of SSBs at a third periodicity less than the second periodicity in response to the uplink trigger.

Aspect 32: A UE comprising a transceiver, a memory, and a processor coupled to the transceiver and the memory, the processor and the memory configured to perform a method of any one of aspects 25 through 31.

Aspect 33: A UE comprising means for performing a method of any one of aspects 25 through 31.

Aspect 34: An article of manufacture comprising a non-transitory computer-readable medium having stored therein instructions executable by one or more processors of a UE to perform a method of any one of aspects 25 through 31.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-25 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 12, 15, 20, and/or 25 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A network entity configured for wireless communication, the network entity comprising:
   one or more memories; and
   one or more processors coupled to the one or more memories, the one or more processors configured to:
      provide a discovery signal on a first set of frequency resources within a bandwidth part to facilitate discovery of a cell associated with the network entity; and
      provide a synchronization signal block (SSB) on a second set of frequency resources within the same bandwidth part to provide a cell identifier (ID) of the cell, wherein a portion of the second set of frequency resources is different than the first set of frequency resources and wherein the second set of frequency resources partially overlaps the first set of frequency resources.

2. The network entity of claim 1, further comprising:
   a communication interface, and wherein the one or more processors are further configured to:
      transmit a plurality of discovery signal bursts within an SSB period via the communication interface.

3. The network entity of claim 2, wherein each of the plurality of discovery signal bursts comprises a respective discovery signal burst index identifying the respective discovery signal burst within the SSB period.

4. The network entity of claim 2, wherein each of the plurality of discovery signal bursts within the SSB period comprises a burst offset to a next SSB burst.

5. The network entity of claim 1, wherein the discovery signal comprises a first primary synchronization signal (PSS) associated with a first PSS identifier (ID) and the SSB comprises a second PSS associated with a second PSS ID different than the first PSS ID.

6. The network entity of claim 5, wherein the one or more processors are further configured to:
   provide a mapping between the first PSS ID and the second PSS ID.

7. The network entity of claim 1, wherein the one or more processors are further configured to:
   transmit a plurality of discovery signals at a first periodicity; and
   transmit a plurality of SSBs at a second periodicity greater than the first periodicity on an off-raster frequency to enable radio resource management (RRM) for a user equipment (UE) within an SSB measurement timing configuration (SMTC) window aligned to the second periodicity.

8. The network entity of claim 1, wherein the one or more processors are further configured to:
   receive an uplink trigger from a user equipment (UE), the uplink trigger being associated with transmission of the SSB.

9. The network entity of claim 8, wherein the uplink trigger is received on a third set of frequency resources within the bandwidth part, the third set of frequency resources at least partially overlapping the first set of frequency resources and the second set of frequency resources.

10. The network entity of claim 8, wherein the one or more processors are further configured to:
transmit the SSB on-demand in response to the uplink trigger.

11. The network entity of claim 10, wherein the SSB is transmitted on an off-raster frequency and the cell is a secondary serving cell for the UE.

12. The network entity of claim 8, wherein the one or more processors are further configured to:
transmit a plurality of discovery signals at a first periodicity;
transmit a first plurality of SSBs at a second periodicity greater than the first periodicity; and
transmit a second plurality of SSBs at a third periodicity less than the second periodicity in response to receiving the uplink trigger.

13. The network entity of claim 12, wherein the one or more processors are further configured to:
transmit the second plurality of SSBs in a direction of the UE.

14. The network entity of claim 8, wherein the one or more processors are further configured to:
transmit a plurality of discovery signal bursts within an uplink trigger (ULT) period, each of the plurality of discovery signal bursts comprising a burst offset to a next ULT burst.

15. The network entity of claim 8, wherein the discovery signal comprises an offset to the uplink trigger (ULT).

16. The network entity of claim 8, wherein the one or more processors are further configured to:
transmit the SSB in response to a measurement of the uplink trigger being greater than or equal to a threshold.

17. The network entity of claim 16, wherein the one or more processors are further configured to:
delay transmission of the SSB in response to the measurement of the uplink trigger being less than the threshold.

18. The network entity of claim 17, wherein the one or more processors are further configured to:
delay transmission of the SSB by a delay amount based on a mapping between the measurement and the delay amount.

19. The network entity of claim 16, wherein the one or more processors are further configured to:
communicate with at least one additional network entity to indicate a response to the uplink trigger based on the measurement.

20. The network entity of claim 19, wherein the one or more processors are further configured to:
transmit a signal carrying the response and one or more parameters related to the response to the at least one additional network entity.

21. A method for wireless communication at a network entity, the method comprising:
providing a discovery signal on a first set of frequency resources within a bandwidth part to facilitate discovery of a cell associated with the network entity; and
providing a synchronization signal block (SSB) on a second set of frequency resources within the bandwidth part to provide a cell identifier (ID) of the cell, wherein a portion of the second set of frequency resources is different than the first set of frequency resources and wherein the second set of frequency resources partially overlaps the first set of frequency resources.

22. A user equipment (UE) configured for wireless communication, the UE comprising:
one or more memories;
one or more processors coupled to the one or more memories, the one or more processors being configured to:
receive a discovery signal on a first set of frequency resources within a bandwidth part to facilitate discovery of a cell associated with a network entity; and
receive a synchronization signal block (SSB) on a second set of frequency resources within the bandwidth part to determine a cell identifier (ID) of the cell, wherein a portion of the second set of frequency resources is different than the first set of frequency resources and wherein the second set of frequency resources partially overlaps the first set of frequency resources.

23. The UE of claim 22, wherein the one or more processors are further configured to:
receive a plurality of discovery signal bursts within an SSB period, each of the plurality of discovery signal bursts comprising either a respective discovery signal burst index identifying the respective discovery signal burst within the SSB period or a burst offset to a next SSB burst.

24. The UE of claim 23, wherein the discovery signal comprises a first primary synchronization signal (PSS) associated with a first PSS identifier (ID) and the SSB comprises a second PSS associated with a second PSS ID different than the first PSS ID, and wherein the one or more processors are further configured to:
receive a mapping between the first PSS ID and the second PSS ID.

25. The UE of claim 22, wherein the one or more processors are further configured to:
receive a plurality of discovery signals at a first periodicity;
receive a plurality of SSBs at a second periodicity greater than the first periodicity on an off-raster frequency; and
perform radio resource management (RRM) with the cell using an SSB measurement timing configuration (SMTC) window aligned to the second periodicity.

26. The UE of claim 22, wherein the one or more processors are further configured to:
transmit an uplink trigger, the uplink trigger being associated with transmission of the SSB and being transmitted on a third set of frequency resources within the bandwidth part, the third set of frequency resources at least partially overlapping the first set of frequency resources and the second set of frequency resources.

27. The UE of claim 26, wherein the one or more processors are further configured to:
receive the SSB on-demand in response to the uplink trigger.

28. The UE of claim 26, wherein the one or more processors are further configured to:
receive a plurality of discovery signals at a first periodicity;
receive a first plurality of SSBs at a second periodicity greater than the first periodicity; and
receive a second plurality of SSBs at a third periodicity less than the second periodicity in response to the uplink trigger.

29. A method for wireless communication at a user equipment (UE), the method comprising:

receiving a discovery signal on a first set of frequency resources within a bandwidth part to facilitate discovery of a cell associated with a network entity; and receiving a synchronization signal block (SSB) on a second set of frequency resources within the bandwidth part to determine a cell identifier (ID) of the cell, wherein a portion of the second set of frequency resources is different than the first set of frequency resources and wherein the second set of frequency resources partially overlaps the first set of frequency resources.

* * * * *